United States Patent
Li et al.

(10) Patent No.: US 10,779,298 B2
(45) Date of Patent: Sep. 15, 2020

(54) UPLINK DATA SENDING METHOD, UPLINK DATA SCHEDULING METHOD, AND APPARATUS

(71) Applicant: HUAWEI TECHNOLOGIES CO., LTD., Shenzhen, Guangdong (CN)

(72) Inventors: Chaojun Li, Beijing (CN); Brian Classon, Beijing (CN); Yongxia Lyu, Ottawa (CA); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 24 days.

(21) Appl. No.: 16/146,930

(22) Filed: Sep. 28, 2018

(65) Prior Publication Data

US 2019/0037581 A1 Jan. 31, 2019

Related U.S. Application Data

(63) Continuation of application No. PCT/CN2016/078113, filed on Mar. 31, 2016.

(51) Int. Cl.
*H04W 72/12* (2009.01)
*H04W 72/04* (2009.01)

(52) U.S. Cl.
CPC ........... *H04W 72/12* (2013.01); *H04W 72/04* (2013.01); *H04W 72/0446* (2013.01)

(58) Field of Classification Search
CPC .. H04W 72/0446; H04W 72/04; H04W 72/12
See application file for complete search history.

(56) References Cited

U.S. PATENT DOCUMENTS

2011/0021227 A1  1/2011  Dai et al.
2016/0135182 A1* 5/2016  Jung ............... H04L 5/0064
                                                370/336
(Continued)

FOREIGN PATENT DOCUMENTS

CN  101242668 A  8/2008
CN  101400140 A  4/2009
(Continued)

OTHER PUBLICATIONS

Office Action issued in Japanese Application No. 2018-551806 dated Sep. 24, 2019, 6 pages (with English translation).
(Continued)

*Primary Examiner* — Brian D Nguyen
(74) *Attorney, Agent, or Firm* — Fish & Richardson P.C.

(57) ABSTRACT

The present invention provides an uplink data sending method. The method includes: receiving, by a terminal device, scheduling signaling in at least one downlink time interval in a downlink time interval set, where the scheduling signaling is used to schedule uplink data, and any downlink time interval in the downlink time interval set belongs to a downlink subframe n; determining, by the terminal device, an uplink time interval corresponding to the at least one downlink time interval, where the any downlink time interval in the downlink time interval set is corresponding to the determined uplink time interval, the determined uplink time interval belongs to an uplink subframe n+k, and k is equal to 0, 1, 2, or 3; and sending, by the terminal device, the uplink data in the determined uplink time interval. In the foregoing solution, a latency from receiving scheduling information to sending uplink data can be reduced.

16 Claims, 5 Drawing Sheets

```
┌─────────────────────────────────────────────┐
│ A terminal device receives scheduling       │
│ signaling in at least one downlink time     │
│ interval in a downlink time interval set,   │──  101
│ where the scheduling signaling is used to   │
│ schedule uplink data, and any downlink      │
│ time interval in the downlink time          │
│ interval set belongs to a downlink subframe n│
└─────────────────────────────────────────────┘
                     │
                     ▼
┌─────────────────────────────────────────────┐
│ The terminal device determines an uplink    │
│ time interval corresponding to the at least │
│ one downlink time interval, where the any   │
│ downlink time interval in the downlink time │──  102
│ interval set is corresponding to the        │
│ determined uplink time interval, the        │
│ determined uplink time interval belongs to  │
│ an uplink subframe n+k, and k is equal to   │
│ 0, 1, 2, or 3                               │
└─────────────────────────────────────────────┘
                     │
                     ▼
┌─────────────────────────────────────────────┐
│ The terminal device sends the uplink data   │──  103
│ in the determined uplink time interval      │
└─────────────────────────────────────────────┘
```

(56) References Cited

U.S. PATENT DOCUMENTS

| | | | |
|---|---|---|---|
| 2016/0249329 A1* | 8/2016 | Au | H04W 72/042 |
| 2016/0278117 A1* | 9/2016 | Sahlin | H04W 72/0446 |
| 2016/0286435 A1* | 9/2016 | Zhang | H04L 5/0055 |
| 2016/0323070 A1* | 11/2016 | Chen | H04W 56/0045 |
| 2016/0323893 A1* | 11/2016 | Feng | H04W 72/1226 |
| 2017/0006637 A1* | 1/2017 | Sahlin | H04L 5/0007 |
| 2017/0290008 A1* | 10/2017 | Tooher | H04L 1/0007 |
| 2018/0049165 A1* | 2/2018 | Byun | H04W 72/0446 |
| 2019/0021072 A1* | 1/2019 | Horiuchi | H04L 1/0003 |

FOREIGN PATENT DOCUMENTS

| | | |
|---|---|---|
| CN | 101588632 B | 4/2011 |
| CN | 102231662 A | 11/2011 |
| CN | 102281646 A | 12/2011 |
| EP | 2256970 A1 | 12/2010 |
| EP | 2198662 B1 | 12/2012 |
| KR | 20150140629 A | 12/2015 |

OTHER PUBLICATIONS

R1-160294—Huawei, HiSilicon, "Short TTI for UL transmissions," 3GPP TSG-RAN WG1 #84, St Julian's, Malta, Feb. 15-19, 2016, 5 pages.
R1-160426—Intel Corporation, "Latency reduction between UL grant and PUSCH," 3GPP TSG-RAN WG1 #84, St Julian's, Malta, Feb. 15-19, 2016, 4 pages.
3GPP TS 36.212 V13.1.0 (Mar. 2016),3rd Generation Partnership Project;Technical Specification Group Radio Access Network;Evolved Universal Terrestrial Radio Access (E-UTRA);Multiplexing and channel coding(Release 13),dated Mar. 29, 2016,total 129 pages.
3GPP TS 36.211 V13.1.0 (Mar. 2016), 3rd Generation Partnership Project;Technical Specification Group Radio Access Network;Evolved Universal Terrestrial Radio Access (E-UTRA);Physical channels and modulation(Release 13),dated Mar. 29, 2016,total 155 pages.
3GPP TS 36.213 V13.1.0 (Mar. 2016),3rd Generation Partnership Project;Technical Specification Group Radio Access Network;Evolved Universal Terrestrial Radio Access (E-UTRA);Physical layer procedure(Release 13),total 361 pages.
3GPP TS 36306 V13.0.0 (Dec. 2015),3rd Generation Partnership Project;Technical Specification Group Radio Access Network;Evolved Universal Terrestrial Radio Access (E-UTRA);User Equipment (UE) radio access capabilities (Release 13),total 48 pages.
International Search Report and Written Opinion issued in International Application No. PCT/CN2016/078113 dated Dec. 27, 2016, 17 pages.
R1-160938 Ericsson,"DCI for short TTI uplink transmissions",3GPP TSG RAN WG1 Meeting #84,Malta, Feb. 15-19, 2016,total 7 pages.
R2-154322 LG Electronics Inc.,"Long-duration UL grant",3GPP TSG-RAN WG2 Meeting #91bis,Malmö, Sweden, Oct. 4-Oct. 9, 2015,total 3 pages.
R1-160937 Ericsson,"Overview of TTI shortening and reduced processing time for UL transmissions",3GPP TSG RAN NG1 Meeting #84, Malta, Feb. 15-19, 2016,total 5 pages.
R1-160942 Ericsson,"Processing time reduction in UL",3GPP TSG RAN WG1 Meeting #84,Malta, Feb. 15-19, 2016,total 4 pages.
Extended European Search Report issued in European Application No. 16895984.9 dated Feb. 4, 2019, 15 pages.
Office Action issued in Chinese Application No. 201680084375.8 dated Mar. 3, 2020, 9 pages (with English translation).
Office Action issued in Indian Application No. 201837037833 dated Jul. 10, 2020, 6 pages.

* cited by examiner

UPLINK DATA SENDING METHOD, UPLINK DATA SCHEDULING METHOD, AND APPARATUS

CROSS-REFERENCE TO RELATED APPLICATIONS

This application is a continuation of International Application No. PCT/CN2016/078113, filed on Mar. 31, 2016, the disclosure of which is hereby incorporated by reference in its entirety.

TECHNICAL FIELD

The present invention relates to the field of communications systems, and in particular, to an uplink data sending method, an uplink data scheduling method, and an apparatus.

BACKGROUND

In a wireless communications system, before sending uplink data, a terminal device needs to obtain scheduling information sent by a network device, for example, time-frequency resource allocation and a modulation and coding scheme. In addition, the network device needs to notify the terminal device of power control command information related to uplink transmission. The scheduling information and the power control command information belong to downlink control information (DCI), that is, the DCI is used to schedule data transmission. The DCI used to schedule uplink data transmission may also be referred to as an uplink grant (UL Grant).

In the wireless communications system, a latency (latency) is one of important factors that affect user experience, and continuously emerging new services also impose an increasingly high requirement on the latency. Therefore, in an existing Long Term Evolution (LTE) system, a communication requirement of a low-latency service cannot be met in a transmission mechanism that is based on a transmission time interval (TTI) of one subframe, namely, 1 millisecond. In the existing LTE system, duration of one subframe is 1 millisecond, one subframe is divided into two slots (slot) whose duration is 0.5 millisecond, and each slot includes six or seven symbols. To further reduce a latency, a TTI length of a physical uplink shared channel (PUSCH) needs to be reduced from one subframe to one slot or even shorter. However, in the existing LTE system, all UL grants are used to schedule uplink data whose TTI length is 1 millisecond, and there is a relatively long latency in scheduling uplink data whose TTI length is less than 1 millisecond.

SUMMARY

Embodiments of the present invention provide an uplink data sending method, an uplink data scheduling method, and an apparatus, so as to reduce a latency in sending uplink data.

According to a first aspect, an uplink data sending method is provided, including:

receiving, by a terminal device, scheduling signaling in at least one downlink time interval in a downlink time interval set, where the scheduling signaling is used to schedule uplink data, and any downlink time interval in the downlink time interval set belongs to a downlink subframe n;

determining, by the terminal device, an uplink time interval corresponding to the at least one downlink time interval, where the any downlink time interval in the downlink time interval set is corresponding to the determined uplink time interval, the determined uplink time interval belongs to an uplink subframe n+k, and k is equal to 0, 1, 2, or 3; and sending, by the terminal device, the uplink data in the determined uplink time interval.

The terminal device may receive the scheduling signaling in any one or more downlink time intervals in the downlink time interval set, and the received scheduling signaling is used to schedule same uplink data, so that the terminal device can receive the scheduling signaling more flexibly with a shorter latency.

According to a second aspect, another uplink data sending method is provided, including:

receiving, by a terminal device, scheduling signaling in at least one downlink time interval in a downlink time interval set, where the scheduling signaling is used to schedule uplink data, the downlink time interval set includes a first subset and a second subset, any downlink time interval in the first subset belongs to a downlink subframe n, and any downlink time interval in the second subset belongs to a downlink subframe n+1;

determining, by the terminal device, an uplink time interval corresponding to the at least one downlink time interval, where any downlink time interval in the downlink time interval set is corresponding to the determined uplink time interval, the determined uplink time interval belongs to an uplink subframe n+k, and k is equal to 1, 2, or 3; and sending, by the terminal device, the uplink data in the determined uplink time interval.

The terminal device may receive the scheduling signaling in any one or more downlink time intervals in the downlink time interval set. The downlink time interval set includes the first subset and the second subset, the any downlink time interval in the first subset belongs to the downlink subframe n, and the any downlink time interval in the second subset belongs to the downlink subframe n+1, so that the terminal device can receive the scheduling signaling more flexibly in time intervals of the subframe n and the subframe n+1.

Further, the uplink data sending methods according to the first aspect and the second aspect may further include the following optional implementations.

Optionally, before the sending, by the terminal device, the uplink data in the determined uplink time interval, the method further includes:

receiving, by the terminal device, signaling used to indicate uplink scheduling timing, where the uplink scheduling timing is used to indicate a correspondence between the downlink time interval set and the determined uplink time interval, and the signaling is higher layer signaling or physical layer signaling; and the determining, by the terminal device, an uplink time interval corresponding to the at least one downlink time interval includes: determining, by the terminal device based on the uplink scheduling timing, the uplink time interval corresponding to the at least one downlink time interval.

Optionally, before the sending, by the terminal device, the uplink data in the determined uplink time interval, the method further includes:

reporting, by the terminal device, a processing capability, where the processing capability is used to indicate an earliest time and a latest time that are supported by the terminal device to send the uplink data.

According to a third aspect, an uplink data scheduling method is provided, including:

sending, by a network device, scheduling signaling in at least one downlink time interval in a downlink time interval set, where the scheduling signaling is used to schedule uplink data, and any downlink time interval in the downlink time interval set belongs to a downlink subframe n;

determining, by the network device, an uplink time interval corresponding to the at least one downlink time interval, where the any downlink time interval in the downlink time interval set is corresponding to the determined uplink time interval, the determined uplink time interval belongs to an uplink subframe n+k, and k is equal to 0, 1, 2, or 3; and receiving, by the network device, the uplink data in the determined uplink time interval.

The network device may perform the step of sending scheduling signaling before performing the step of determining an uplink time interval, or may perform the step of determining an uplink time interval before performing the step of sending scheduling signaling, or may simultaneously perform the step of sending scheduling signaling and the step of determining an uplink time interval.

The network device may send one or more pieces of scheduling signaling in any one or more downlink time intervals in the downlink time interval set, and the one or more pieces of scheduling signaling are used to schedule same uplink data, so that the network device can schedule the uplink data more flexibly with a shorter latency.

According to a fourth aspect, another uplink data scheduling method is provided, including:

sending, by a network device, scheduling signaling in at least one downlink time interval in a downlink time interval set, where the scheduling signaling is used to schedule uplink data, the downlink time interval set includes a first subset and a second subset, any downlink time interval in the first subset belongs to a downlink subframe n, and any downlink time interval in the second subset belongs to a downlink subframe n+1;

determining, by the network device, an uplink time interval corresponding to the at least one downlink time interval, where any downlink time interval in the downlink time interval set is corresponding to the determined uplink time interval, the determined uplink time interval belongs to an uplink subframe n+k, and k is equal to 1, 2, or 3; and receiving, by the network device, the uplink data in the determined uplink time interval.

Further, the uplink data scheduling methods according to the third aspect and the fourth aspect may further include the following optional implementations.

Optionally, before the receiving, by the network device, the uplink data in the determined uplink time interval, the method further includes:

sending, by the network device, signaling used to indicate uplink scheduling timing, where the uplink scheduling timing is used to indicate a correspondence between the downlink time interval set and the determined uplink time interval, and the signaling is higher layer signaling or physical layer signaling.

Optionally, before the receiving, by the network device, the uplink data in the determined uplink time interval, the method further includes:

receiving, by the network device, a processing capability reported by a terminal device, where the processing capability is used to indicate an earliest time and a latest time that are supported by the terminal device to send the uplink data.

According to a fifth aspect, a terminal device is provided, including a processor, a receiver, and a transmitter, where the receiver is configured to receive scheduling signaling in at least one downlink time interval in a downlink time interval set, where the scheduling signaling is used to schedule uplink data, and any downlink time interval in the downlink time interval set belongs to a downlink subframe n;

the processor is configured to determine an uplink time interval corresponding to the at least one downlink time interval, where the any downlink time interval in the downlink time interval set is corresponding to the determined uplink time interval, the determined uplink time interval belongs to an uplink subframe n+k, and k is equal to 0, 1, 2, or 3; and the transmitter is configured to send the uplink data in the determined uplink time interval.

According to a sixth aspect, another terminal device is provided, including a processor, a receiver, and a transmitter, where the receiver is configured to receive scheduling signaling in at least one downlink time interval in a downlink time interval set, where the scheduling signaling is used to schedule uplink data, the downlink time interval set includes a first subset and a second subset, any downlink time interval in the first subset belongs to a downlink subframe n, and any downlink time interval in the second subset belongs to a downlink subframe n+1;

the processor is configured to determine an uplink time interval corresponding to the at least one downlink time interval, where any downlink time interval in the downlink time interval set is corresponding to the determined uplink time interval, the determined uplink time interval belongs to an uplink subframe n+k, and k is equal to 1, 2, or 3; and the transmitter is configured to send the uplink data in the determined uplink time interval.

Further, the terminal devices according to the fifth aspect and the sixth aspect may further include the following optional implementations.

Optionally, the receiver is further configured to: before the transmitter sends the uplink data, receive signaling used to indicate uplink scheduling timing, where the uplink scheduling timing is used to indicate a correspondence between the downlink time interval set and the determined uplink time interval, and the signaling is higher layer signaling or physical layer signaling; and the processor is further configured to determine, based on the uplink scheduling timing, the uplink time interval corresponding to the at least one downlink time interval.

Optionally, the transmitter is further configured to report a processing capability before the transmitter sends the uplink data, where the processing capability is used to indicate an earliest time and a latest time that are supported by the terminal device to send the uplink data.

According to a seventh aspect, a network device is provided, including a processor, a receiver, and a transmitter, where the transmitter is configured to send scheduling signaling in at least one downlink time interval in a downlink time interval set, where the scheduling signaling is used to schedule uplink data, and any downlink time interval in the downlink time interval set belongs to a downlink subframe n;

the processor is configured to determine an uplink time interval corresponding to the at least one downlink time interval, where the any downlink time interval in the downlink time interval set is corresponding to the determined uplink time interval, the determined uplink time interval belongs to an uplink subframe n+k, and k is equal to 0, 1, 2, or 3; and the receiver is configured to receive the uplink data in the determined uplink time interval.

According to an eighth aspect, another network device is provided, including a processor, a receiver, and a transmitter, where the transmitter is configured to send scheduling signaling in at least one downlink time interval in a downlink time interval set, where the scheduling signaling is used to schedule uplink data, the downlink time interval set includes a first subset and a second subset, any downlink time interval in the first subset belongs to a downlink subframe n, and any downlink time interval in the second subset belongs to a downlink subframe n+1;

the processor is configured to determine an uplink time interval corresponding to the at least one downlink time interval, where any downlink time interval in the downlink time interval set is corresponding to the determined uplink time interval, the determined uplink time interval belongs to an uplink subframe n+k, and k is equal to 1, 2, or 3; and the receiver is configured to receive the uplink data in the determined uplink time interval.

Further, the network devices according to the seventh aspect and the eighth aspect may further include the following optional implementations.

Optionally, the transmitter is further configured to: before the receiver receives the uplink data, send signaling used to indicate uplink scheduling timing, where the uplink scheduling timing is used to indicate a correspondence between the downlink time interval set and the determined uplink time interval, and the signaling is higher layer signaling or physical layer signaling.

Optionally, the receiver is further configured to: before the receiver receives the uplink data, receive a processing capability reported by a terminal device, where the processing capability is used to indicate an earliest time and a latest time that are supported by the terminal device to send the uplink data.

Further, the foregoing aspects may further include the following optional implementations.

Optionally, a length of the determined uplink time interval is greater than or equal to a length of the any downlink time interval in the downlink time interval set.

Optionally, the downlink subframe n includes i downlink time intervals, i is a positive integer, and the downlink time interval set is a subset of the i downlink time intervals.

Optionally, the uplink subframe n+k includes j uplink time intervals, j is a positive integer, and the determined uplink time interval is one of the j uplink time intervals.

Optionally, i is different from j.

Optionally, i=2, a downlink time interval 0 of the downlink subframe n includes a slot 0, and a downlink time interval 1 of the downlink subframe n includes a slot 1; or i=4, a downlink time interval 0 of the downlink subframe n includes symbols {#0, #1, #2, #3}, a downlink time interval 1 of the downlink subframe n includes symbols {#4, #5, #6}, a downlink time interval 2 of the downlink subframe n includes symbols {#7, #8, #9, #10}, and a downlink time interval 3 of the downlink subframe n includes symbols {#11, #12, #13}; or i=7, a downlink time interval 0 of the downlink subframe n includes symbols {#0, #1}, a downlink time interval 1 of the downlink subframe n includes symbols {#2, #3}, a downlink time interval 2 of the downlink subframe n includes symbols {#4, #5}, a downlink time interval 3 of the downlink subframe n includes symbols {#6, #7}, a downlink time interval 4 of the downlink subframe n includes symbols {#8, #9}, a downlink time interval 5 of the downlink subframe n includes symbols {#10, #11}, and a downlink time interval 6 of the downlink subframe n includes symbols {#12, #13}; and/or j=2, an uplink time interval 0 of the uplink subframe n+k includes a slot 0, and an uplink time interval 1 of the uplink subframe n+k includes a slot 1; or j=4, an uplink time interval 0 of the uplink subframe n+k includes symbols {#0, #1, #2, #3}, an uplink time interval 1 of the uplink subframe n+k includes symbols {#3, #4, #5, #6}, an uplink time interval 2 of the uplink subframe n+k includes symbols {#7, #8, #9, #10}, and an uplink time interval 3 of the uplink subframe n+k includes symbols {#10, #11, #12, #13}; or j=7, an uplink time interval 0 of the uplink subframe n+k includes symbols {#0, #1}, an uplink time interval 1 of the uplink subframe n+k includes symbols {#2, #3}, an uplink time interval 2 of the uplink subframe n+k includes symbols {#4, #5}, an uplink time interval 3 of the uplink subframe n+k includes symbols {#6, #7}, an uplink time interval 4 of the uplink subframe n+k includes symbols {#8, #9}, an uplink time interval 5 of the uplink subframe n+k includes symbols {#10, #11}, and an uplink time interval 6 of the uplink subframe n+k includes symbols {#12, #13}.

Optionally, the length of the any downlink time interval in the downlink time interval set is two symbols, and the length of the determined uplink time interval is three or four symbols; or the length of the any downlink time interval in the downlink time interval set is two symbols, and the length of the determined uplink time interval is 0.5 millisecond; or lengths of some downlink time intervals in the downlink time interval set are three symbols, lengths of the other downlink time intervals are four symbols, and the length of the determined uplink time interval is 0.5 millisecond; or the length of the any downlink time interval in the downlink time interval set is one symbol, and the length of the determined uplink time interval is two symbols; or the length of the any downlink time interval in the downlink time interval set is 0.5 millisecond, and the length of the determined uplink time interval is 1 millisecond.

Optionally, the length of the any downlink time interval in the downlink time interval set is two symbols, the length of the determined uplink time interval is three or four symbols, i=7, and j=4; and the downlink time interval set includes at least one of the downlink time interval 0 and the downlink time interval 1 of the downlink subframe n, and the determined uplink time interval is the uplink time interval 0 of the uplink subframe n+k; or the downlink time interval set includes at least one of the downlink time interval 1 and the downlink time interval 2 of the downlink subframe n, and the determined uplink time interval is the uplink time interval 1 of the uplink subframe n+k; or the downlink time interval set includes the downlink time interval 2 and the downlink time interval 3 of the downlink subframe n, and the determined uplink time interval is the uplink time interval 1 of the uplink subframe n+k; or the downlink time interval set includes the downlink time interval 3 and the downlink time interval 4 of the downlink subframe n, and the determined uplink time interval is the uplink time interval 2 of the uplink subframe n+k; or the downlink time interval set includes the downlink time interval 4 and the downlink time interval 5 of the downlink subframe n, and the determined uplink time interval is the uplink time interval 2 of the uplink subframe n+k; or the downlink time interval set includes the downlink time interval 5 and the downlink time interval 6 of the downlink subframe n, and the determined uplink time interval is the uplink time interval 3 of the uplink subframe n+k; or the downlink time interval set includes the downlink time interval 6 of the downlink subframe n, and the determined uplink time interval is the uplink time interval 3 of the uplink subframe n+k.

Optionally, the length of the any downlink time interval in the downlink time interval set is two symbols, the length of the determined uplink time interval is 0.5 millisecond, i=7, and j=2; and the downlink time interval set includes at least two of the downlink time interval 0, the downlink time interval 1, and the downlink time interval 2 of the downlink subframe n, and the determined uplink time interval is the uplink time interval 0 of the uplink subframe n+k; or the downlink time interval set includes at least three of the downlink time interval 0, the downlink time interval 1, the downlink time interval 2, and the downlink time interval 3 of the downlink subframe n, and the determined uplink time interval is the uplink time interval 0 of the uplink subframe n+k; or the downlink time interval set includes the downlink time interval 3, the downlink time interval 4, the downlink time interval 5, and the downlink time interval 6 of the downlink subframe n, and the determined uplink time interval is the uplink time interval 1 of the uplink subframe n+k; or the downlink time interval set includes the downlink time interval 4, the downlink time interval 5, and the downlink time interval 6 of the downlink subframe n, and the determined uplink time interval is the uplink time interval 1 of the uplink subframe n+k.

Optionally, the length of the any downlink time interval in the downlink time interval set is three or four symbols, the length of the determined uplink time interval is 0.5 millisecond, i=4, and j=2; and the downlink time interval set includes the downlink time interval 0 and the downlink time interval 1 of the downlink subframe n, and the determined uplink time interval is the uplink time interval 0 of the uplink subframe n+k; or the downlink time interval set includes the downlink time interval 2 and the downlink time interval 3 of the downlink subframe n, and the determined uplink time interval is the uplink time interval 1 of the uplink subframe n+k.

Optionally, the scheduling signaling is an uplink grant UL grant; or the scheduling signaling is signaling that carries hybrid automatic repeat request-acknowledgement HARQ-ACK information, where the HARQ-ACK information indicates a negative acknowledgement NACK.

Optionally, at least two downlink time intervals in the downlink time interval set are not equal in length.

In the embodiments of the present invention, the terminal device receives, in the at least one downlink time interval in the downlink time interval set, the scheduling signaling sent by the network device, and sends the uplink data in the determined uplink time interval. The any downlink time interval in the downlink time interval set is corresponding to the determined uplink time interval, and a time interval between the determined uplink time interval and the any downlink time interval in the downlink time interval set is less than 4 milliseconds. Therefore, a new uplink scheduling time sequence is introduced, and a latency is effectively reduced. In addition, when the downlink time interval set includes a plurality of downlink time intervals, the network device may send the scheduling signaling in any one or more downlink time intervals in the downlink time interval set. Therefore, the network device has more opportunities to send the scheduling signaling, and scheduling flexibility and a probability of successful uplink data scheduling are improved.

DESCRIPTION OF EMBODIMENTS

Figure 1:
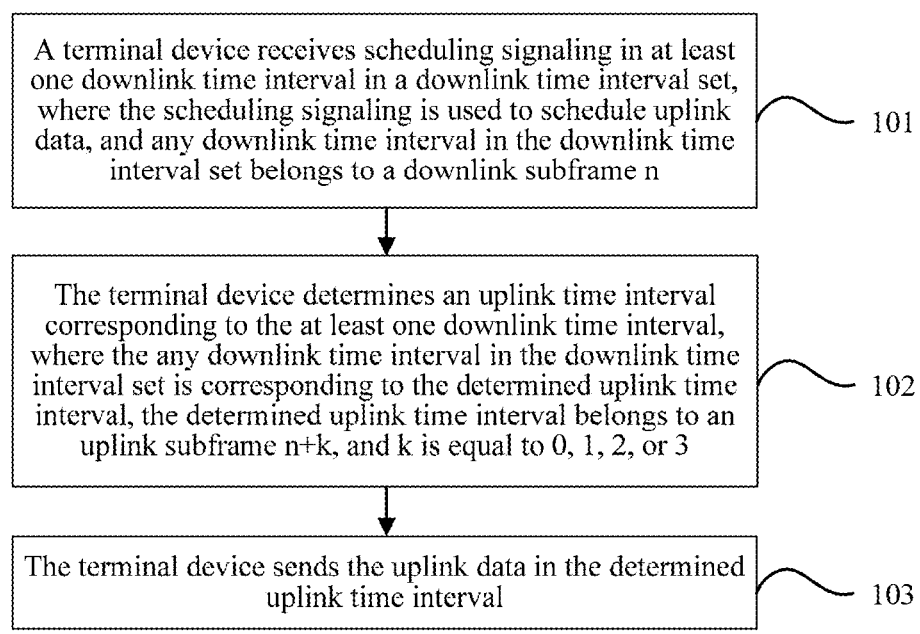
FIG. 1 is a schematic flowchart of an uplink data sending method according to an embodiment of the present invention.

To facilitate understanding of the technical solutions in the embodiments of the present invention, basic concepts in the embodiments of the present invention are first described.

1. Frame Structure

A radio frame (radio frame) in an LTE system includes 10 subframes (subframe), a length of each subframe is 1 millisecond, each subframe includes two slots (slot), and each slot is 0.5 millisecond.

A quantity of symbols included in each slot is related to a length of a cyclic prefix (cyclic prefix, CP) in a subframe. If the CP is a normal (normal) CP, each slot includes seven symbols, and each subframe includes 14 symbols. For example, each subframe includes symbols whose sequence numbers are respectively #0, #1, #2, #3, #4, #5, #6, #7, #8, #9, #10, #11, #12, and #13. If the CP is an extended (extended) CP, each slot includes six symbols, and each subframe includes 12 symbols. For example, each subframe includes symbols whose sequence numbers are respectively #0, #1, #2, #3, #4, #5, #6, #7, #8, #9, #10, and #11.

In the embodiments of the present invention, an uplink symbol and a downlink symbol are both referred to as a symbol for short. The uplink symbol is referred to as a single carrier frequency division multiple (SC-FDMA) symbol, and the downlink symbol is referred to as an orthogonal frequency division multiple (OFDM) symbol. It should be noted that if an uplink multiple access manner of orthogonal frequency division multiple access (OFDMA) is introduced into a subsequent technology, the uplink symbol may also be referred to as a symbol of another type, for example, an OFDM symbol. The uplink multiple access manner and a downlink multiple access manner are not limited in the present invention.

2. TTI Length

Currently, various physical channels in an LTE system are designed based on a TTI length of 1 millisecond. It should be noted that although the TTI length is 1 millisecond, a time domain resource occupied by data transmission may be less than 1 millisecond. For example, a last symbol of an uplink subframe may be used to transmit a sounding reference signal (SRS). Therefore, a time domain resource occupied by uplink data transmission whose TTI length is 1 millisecond may be less than 1 millisecond.

Short TTI data transmission means that a TTI length for data transmission is less than one subframe or 1 millisecond. For example, a short TTI length is 0.5 millisecond, four symbols, three symbols, two symbols, or one symbol. Likewise, a time domain resource occupied by the short TTI data transmission may also be less than the short TTI length.

The technical solutions in the embodiments of the present invention can be applied to an LTE system. The LTE system includes a network device and a terminal device, and certainly, may further include another device used for communication. In the LTE system, before sending uplink data, the terminal device needs to receive scheduling signaling sent by the network device, to obtain scheduling information, and then sends the uplink data on a PUSCH based on the scheduling information. Because wireless transmission and device processing both need times, there is a latency between the downlink scheduling information and the uplink data. For example, in an existing frequency division duplex (FDD) mode, the latency is fixed and is 4 milliseconds, namely, four subframes. However, in an existing time division duplex (TDD) mode, the latency is greater than or equal to 4 milliseconds.

The embodiments of the present invention may be applied to a wireless communications system that includes a network device and a terminal device (terminal device or terminal equipment). The terminal device may be a device that provides voice and/or data connectivity for a user, a handheld device with a wireless connection function, or another processing device connected to a wireless modem. The terminal device may communicate with one or more core networks by using a radio access network (for example, RAN). The terminal device may be a mobile terminal such as a mobile phone (or referred to as a "cellular" phone) or a computer with a mobile terminal. For example, the terminal device may be a portable, pocket-sized, handheld, computer built-in, or in-vehicle mobile apparatus that exchanges voice and/or data with the radio access network. For example, the terminal device may be a device such as a personal communications service (PCS) phone, a cordless telephone set, a Session Initiation Protocol (SIP) phone, a wireless local loop (WLL) station, or a personal digital assistant (PDA). The terminal device may also be referred to as a system, a subscriber unit (SU), a subscriber station (SS), a mobile station (MS), a remote station (RS), an access point (AP), a remote device (RT), an access terminal (AT), a user terminal (UT), a user agent (UA), a user device, or user equipment (UE). The network device may be a base station, an enhanced base station, a relay with a scheduling function, a device with a function of a base station, or the like. The base station may be an evolved NodeB (eNB or eNodeB) in an LTE system, or a base station in another system. This is not limited in the embodiments of the present invention.

It should be noted that the LTE system is used as an example for describing the embodiments of the present invention, but this does not mean that the embodiments of the present invention are applicable to only the LTE system. Actually, the technical solutions provided in the embodiments of the present invention may be used in any wireless communications system in which uplink data is scheduled by using scheduling signaling.

In all the embodiments of the present invention, n in a downlink subframe n and n+k in an uplink subframe are both used to identify a subframe. A subframe n+k is a $k^{th}$ subframe after a subframe n. When k is equal to 0, the subframe n+k represents the subframe n. When k is equal to 1, 2, or 3, the subframe n+k respectively represents a first subframe, a second subframe, or a third subframe after the subframe n.

For example, in an LTE system, one radio frame includes 10 subframes that are respectively marked as a subframe 0 to a subframe 9. Therefore, n may be an integer greater than or equal to 0 and less than or equal to 9. A subframe n represents an $(n+1)^{th}$ subframe of a radio frame in which the subframe n is located. Correspondingly, a downlink subframe n represents an $(n+1)^{th}$ downlink subframe of a downlink radio frame in which the downlink subframe n is located, and an uplink subframe n represents an $(n+1)^{th}$ uplink subframe of an uplink radio frame in which the uplink subframe n is located. A subframe n+k represents a $k^{th}$ subframe after the subframe n. Based on values of n and k, when a value of n+k is less than or equal to 9, the subframe n and the subframe n+k are located in a same radio frame, and the subframe n+k represents an $(n+k+1)^{th}$ subframe of the radio frame in which the subframe n is located. Correspondingly, an uplink subframe n+k represents an $(n+k+1)^{th}$ uplink subframe of the uplink radio frame in which the uplink subframe n is located. When the value of n+k is greater than 9, the subframe n and the subframe n+k are located in different radio frames, the subframe n+k is a subframe n+k−10 of a radio frame next to the radio frame in which the subframe n is located, that is, the subframe n+k represents an $(n+k-9)^{th}$ subframe of the radio frame next to the radio frame in which the subframe n is located. Correspondingly, a downlink subframe n+k represents an $(n+k-9)^{th}$ downlink subframe of a downlink radio frame next to the downlink radio frame in which the downlink subframe n is located, and the uplink subframe n+k represents an $(n+k-9)^{th}$ uplink subframe of an uplink radio frame next to the uplink radio frame in which the uplink subframe n is located. For example, when n=0, and k=2, the subframe n (namely, the subframe 0) and the subframe n+k (namely, the subframe 2) are respectively a first subframe and a third subframe of a same radio frame. For example, when n=8, and k=2, the subframe n (namely, the subframe 8) is a ninth subframe in the radio frame in which the subframe n is located, and the subframe n+k (namely, the subframe 0) is a first subframe of a next radio frame. It should be noted that the foregoing values of n are merely examples, and n may be another value. For example, n may be an integer greater than or equal to 1 and less than or equal to 10. Alternatively, one radio frame may include N subframes, where $1 \le n \le N$, or $0 \le n \le N-1$, and a value of N may be a positive integer.

In the embodiments of the present invention, a time interval (TI) is a continuous time period. A time interval included in a subframe may be referred to as a time interval in the subframe. One subframe may include one or more time intervals. Correspondingly, a time interval included in an uplink subframe may be referred to as an uplink time interval, and a time interval included in a downlink subframe may be referred to as a downlink time interval.

To make a person skilled in the art understand the solutions in the embodiments of the present invention better, the following further describes the embodiments of the present invention with reference to the accompanying drawings and implementations.

FIG. 1 is a schematic flowchart of an uplink data sending method according to an embodiment of the present invention. The method includes the following steps.

Step 101: A terminal device receives scheduling signaling in at least one downlink time interval in a downlink time interval set, where the scheduling signaling is used to schedule uplink data, and any downlink time interval in the downlink time interval set belongs to a downlink subframe n.

Step 102: The terminal device determines an uplink time interval corresponding to the at least one downlink time interval, where the any downlink time interval in the downlink time interval set is corresponding to the determined uplink time interval, the determined uplink time interval belongs to an uplink subframe n+k, and k is equal to 0, 1, 2, or 3.

Step 103: The terminal device sends the uplink data in the determined uplink time interval.

In the technical solution in this embodiment of the present invention, the terminal device receives the scheduling signaling in the at least one downlink time interval in the downlink time interval set, determines the uplink time interval corresponding to the at least one downlink time interval, where the any downlink time interval in the downlink time interval set is corresponding to the determined uplink time interval, and sends the uplink data in the determined uplink time interval. In this embodiment of the present invention, a new uplink scheduling time sequence is introduced, so that a time interval between the any downlink time interval in the downlink time interval set and the determined uplink time interval is less than 4 milliseconds. Therefore, a latency is effectively reduced. In addition, when the downlink time interval set includes a plurality of downlink time intervals, a network device may send the scheduling signaling in any one or more downlink time intervals in the downlink time interval set. Therefore, the network device has more opportunities to send the scheduling signaling, and scheduling flexibility and a probability of successful uplink data scheduling are improved.

In an optional embodiment, the downlink time interval set may further include a time interval that belongs to a downlink subframe n+1. For example:

Step 101': A terminal device receives scheduling signaling in at least one downlink time interval in a downlink time interval set, where the scheduling signaling is used to schedule uplink data, the downlink time interval set includes a first subset and a second subset, any downlink time interval in the first subset belongs to a downlink subframe n, and any downlink time interval in the second subset belongs to a downlink subframe n+1.

Step 102': The terminal device determines an uplink time interval corresponding to the at least one downlink time interval, where any downlink time interval in the downlink time interval set is corresponding to the determined uplink time interval, the determined uplink time interval belongs to an uplink subframe n+k, and k is equal to 1, 2, or 3.

Step 103': The terminal device sends the uplink data in the determined uplink time interval.

Figure 6:
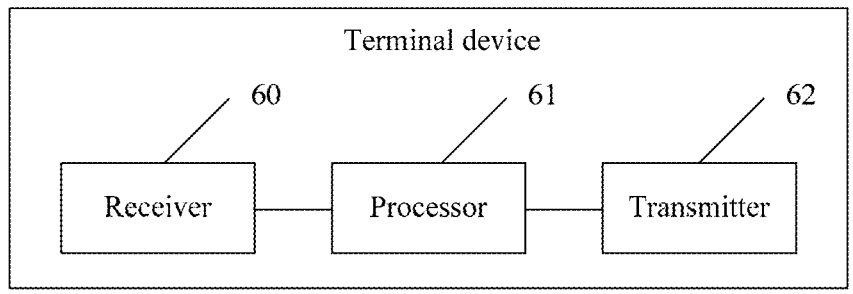
FIG. 6 is a schematic structural diagram of a first terminal device according to an embodiment of the present invention.

Further, an embodiment of the present invention further provides a terminal device for implementing the foregoing method. FIG. 6 is a schematic structural diagram of a terminal device according to an embodiment of the present invention. It should be noted that the terminal device may be configured to perform the method in the foregoing embodiment. Therefore, for content the same as that in the foregoing embodiment, refer to descriptions in the foregoing embodiment.

The terminal device in this embodiment may include a processor, a receiver, and a transmitter. Certainly, the terminal device may further include a memory, and the like.

The receiver is configured to receive scheduling signaling in at least one downlink time interval in a downlink time interval set. The scheduling signaling is used to schedule uplink data, and any downlink time interval in the downlink time interval set belongs to a downlink subframe n.

The processor is configured to determine an uplink time interval corresponding to the at least one downlink time interval. The any downlink time interval in the downlink time interval set is corresponding to the determined uplink time interval, the determined uplink time interval belongs to an uplink subframe n+k, and k is equal to 0, 1, 2, or 3.

The transmitter is configured to send the uplink data in the determined uplink time interval.

In an optional embodiment, the downlink time interval set may further include a time interval that belongs to a downlink subframe n+1. For example:

The receiver is configured to receive scheduling signaling in at least one downlink time interval in a downlink time interval set. The scheduling signaling is used to schedule uplink data, the downlink time interval set includes a first subset and a second subset, any downlink time interval in the first subset belongs to a downlink subframe n, and any downlink time interval in the second subset belongs to a downlink subframe n+1.

The processor is configured to determine an uplink time interval corresponding to the at least one downlink time interval. Any downlink time interval in the downlink time interval set is corresponding to the determined uplink time interval, the determined uplink time interval belongs to an uplink subframe n+k, and k is equal to 1, 2, or 3.

The transmitter is configured to send the uplink data in the determined uplink time interval.

In this embodiment of the present invention, in the step of receiving scheduling signaling in at least one downlink time interval in a downlink time interval set, the downlink time interval set may include any positive integer quantity of downlink time intervals, and each downlink time interval may be of any length. For example, duration of the any downlink time interval in the downlink time interval set is one symbol, two symbols, three symbols, four symbols, or 0.5 millisecond. Optionally, all downlink time intervals in the downlink time interval set have a same length. For example, a length of the any downlink time interval in the downlink time interval set is one symbol, two symbols, three symbols, four symbols, or 0.5 millisecond.

Optionally, at least two downlink time intervals in the downlink time interval set are not equal in length. For example, lengths of some downlink time intervals in the downlink time interval set are three symbols, and lengths of the other downlink time intervals are four symbols. Alternatively, a length of one downlink time interval is one symbol, and lengths of the other downlink time intervals are two symbols. Alternatively, a length of at least one downlink time interval is three symbols, and a length of at least one downlink time interval is four symbols.

Optionally, any two downlink time intervals in the downlink time interval set do not overlap. In other words, the any two downlink time intervals fall within two non-overlapping time periods in the downlink subframe n. For example, the downlink time interval set includes two downlink time intervals, a downlink time interval 0 includes symbols #0,

1, and #2 of the downlink subframe n, and a downlink time interval 1 includes symbols #3, #4, #5, and #6 of the downlink subframe n. In this case, the downlink time interval 0 and the downlink time interval 1 do not overlap.

It should be noted that in this embodiment of the present invention, that a time interval includes a symbol of a subframe indicates that the symbol of the subframe constitutes the time interval. For example, that a downlink time interval 0 includes symbols #0, #1, and #2 of the downlink subframe n indicates that the symbols #0, #1, and #2 of the downlink subframe n constitute the downlink time interval 0. That the determined uplink time interval includes symbols #7, #8, #9, #10, #11, #12, and #13 of the uplink subframe n+k indicates that the symbols #7, #8, #9, #10, #11, #12, and #13 of the uplink subframe n+k constitute the determined uplink time interval. For subsequent content the same as the content herein, refer to descriptions herein.

In this embodiment of the present invention, in the step of determining an uplink time interval corresponding to the at least one downlink time interval, the determined uplink time interval may also be of any length, provided that the determined uplink time interval belongs to the uplink subframe n+k, where k is equal to 0, 1, 2, or 3. For example, a length of the determined uplink time interval may be any one of one symbol, two symbols, three symbols, four symbols, 0.5 millisecond, and one subframe.

Optionally, the length of the determined uplink time interval is greater than the length of the any downlink time interval in the downlink time interval set. For example, the length of the any downlink time interval in the downlink time interval set is two symbols, and the length of the determined uplink time interval is three or four symbols. For example, the length of the any downlink time interval in the downlink time interval set is two symbols, and the length of the determined uplink time interval is 0.5 millisecond or 1 millisecond. For example, the length of the any downlink time interval in the downlink time interval set is three or four symbols, and the length of the determined uplink time interval is 0.5 millisecond or 1 millisecond. For example, lengths of some downlink time intervals in the downlink time interval set are three symbols, lengths of the other downlink time intervals are four symbols, and the length of the determined uplink time interval is 0.5 millisecond or 1 millisecond. For example, the length of the any downlink time interval in the downlink time interval set is one symbol, and the length of the determined uplink time interval is two symbols, three symbols, four symbols, 0.5 millisecond, or 1 millisecond. For example, the length of the any downlink time interval in the downlink time interval set is 0.5 millisecond, and the length of the determined uplink time interval is 1 millisecond.

Figure 2:
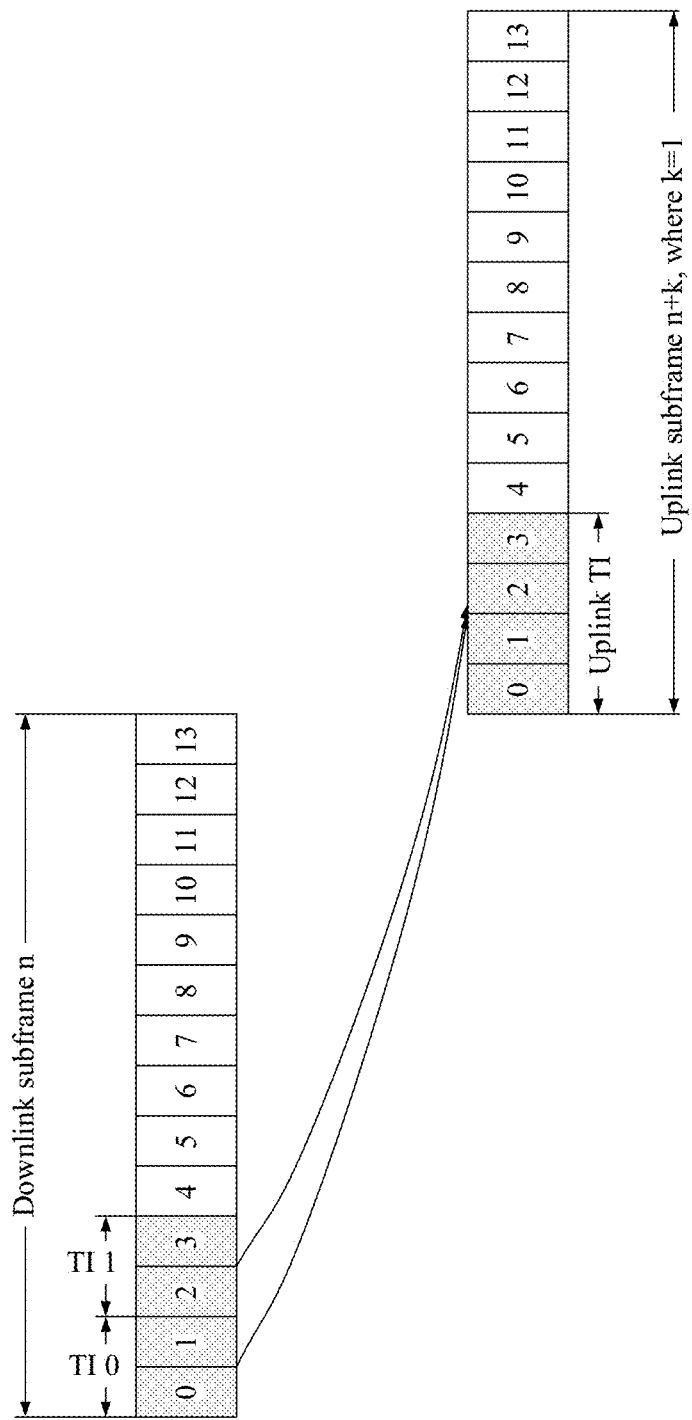
FIG. 2 is a schematic diagram of a first example according to an embodiment of the present invention.

For example, for a normal CP, as shown in FIG. 2, the downlink time interval set includes two downlink time intervals, a downlink time interval 0 includes symbols #0 and #1 of the downlink subframe n, a downlink time interval 1 includes symbols #2 and #3 of the downlink subframe n, and the determined uplink time interval includes symbols #0, #1, #2, and #3 of the uplink subframe n+1. In this case, the downlink time interval 0 and the downlink time interval 1 in the downlink time interval set both are corresponding to the determined uplink time interval, and the terminal device receives the scheduling signaling in at least one of the downlink time interval 0 and the downlink time interval 1, and sends the uplink data in the determined uplink time interval.

In this embodiment of the present invention, optionally, the terminal device may obtain the downlink time interval set from a specified storage location, or may obtain the downlink time interval set from signaling sent by a network device. Optionally, after obtaining the downlink time interval set, the terminal device may determine search space in each downlink time interval in the downlink time interval set, and then detect the scheduling signaling in each determined search space. Alternatively, the terminal device may determine search space in one downlink time interval in the downlink time interval set in sequence, and then detect the scheduling signaling in the determined search space, and after the scheduling signaling is found, the terminal device no longer processes the other downlink time intervals in the downlink time interval set, or if the terminal device does not find the scheduling signaling, the terminal device determines search space in a next downlink time interval in the downlink time interval set in sequence, and detects the scheduling signaling. For example, the sequence may be a sequence of numbers of time intervals in the downlink time interval set, or may be a random sequence. This is not limited in this embodiment of the present invention.

In this embodiment of the present invention, optionally, the terminal device may obtain the at least one downlink time interval from a specified storage location, or may obtain the at least one downlink time interval from signaling sent by a network device. In this case, the concept of the downlink time interval set is transparent to the terminal device, and the terminal device needs to receive the scheduling signaling in only the obtained at least one downlink time interval. Optionally, after obtaining the at least one downlink time interval, the terminal device may determine search space in each of the at least one downlink time interval, and then detect the scheduling signaling in each determined search space. Alternatively, the terminal device may determine search space in one of the at least one downlink time interval in sequence, and then detect the scheduling signaling in the determined search space, and after the scheduling signaling is found, the terminal device no longer processes the other downlink time intervals in the at least one downlink time interval, or if the terminal device does not find the scheduling signaling, the terminal device determines search space in a next downlink time interval in the at least one downlink time interval in sequence, and detects the scheduling signaling. For example, the sequence may be a sequence of numbers of time intervals in the at least one downlink time interval, or may be a random sequence. This is not limited in this embodiment of the present invention.

In this embodiment of the present invention, optionally, the downlink subframe n includes i downlink time intervals, where i is a positive integer. Correspondingly, the i downlink time intervals included in the downlink subframe n may be respectively numbered a downlink time interval 0, . . . , and a downlink time interval i−1 in a front-to-back sequence.

In this embodiment of the present invention, optionally, the uplink subframe n+k includes j uplink time intervals, where j is a positive integer. Correspondingly, the j uplink time intervals included in the uplink subframe n+k may be respectively numbered an uplink time interval 0, . . . , and an uplink time interval j−1 in a front-to-back sequence.

Optionally, i is different from j.

Optionally, the downlink time interval set is a subset of the i downlink time intervals. For example, the downlink time interval set includes at least one of the i downlink time intervals.

Optionally, the determined uplink time interval is one of the j uplink time intervals.

Optionally, in the embodiment in which the downlink time interval set further includes the time interval that belongs to the downlink subframe n+1, the downlink subframe n+1 may include m downlink time intervals, where m is a positive integer, and i is the same as or different from m. In step 101', the downlink time interval set includes the first subset and the second subset, the first subset is a subset of the i downlink time intervals included in the downlink subframe n, and the second subset is a subset of the m downlink time intervals included in the downlink subframe n+1.

Optionally, any two downlink time intervals of the downlink subframe n do not overlap. Therefore, any two downlink time intervals in the downlink time interval set also do not overlap. Optionally, a normal CP is used as an example. One subframe includes two slots, each slot is 0.5 millisecond, each slot includes seven symbols, and 14 symbols of the subframe are respectively marked as #0, #1, #2, #3, #4, #5, #6, #7, #8, #9, #10, #11, #12, and #13.

For example, i or j may be equal to 14, that is, the downlink subframe n or the uplink subframe n+k may include 14 time intervals. A time interval 0 includes the symbol #0, a time interval 1 includes the symbol #1, a time interval 2 includes the symbol #2, a time interval 3 includes the symbol #3, a time interval 4 includes the symbol #4, a time interval 5 includes the symbol #5, a time interval 6 includes the symbol #6, a time interval 7 includes the symbol #7, a time interval 8 includes the symbol #8, a time interval 9 includes the symbol #9, a time interval 10 includes the symbol #10, a time interval 11 includes the symbol #11, a time interval 12 includes the symbol #12, and a time interval 13 includes the symbol #13.

For example, i or j may be equal to 7, that is, the downlink subframe n or the uplink subframe n+k may include seven time intervals. A time interval 0 includes the symbols {#0, #1}, a time interval 1 includes the symbols {#2, #3}, a time interval 2 includes the symbols {#4, #5}, a time interval 3 includes the symbols {#6, #7}, a time interval 4 includes the symbols {#8, #9}, a time interval 5 includes the symbols {#10, #11}, and a time interval 6 includes the symbols {#12, #13}.

For example, i or j may be equal to 5, that is, the downlink subframe n or the uplink subframe n+k may include five time intervals. A time interval 0 includes the symbols {#0, #1}, a time interval 1 includes the symbols {#2, #3, #4}, a time interval 2 includes the symbols {#5, #6, #7}, a time interval 3 includes the symbols {#8, #9, #10}, and a time interval 4 includes the symbols {#11, #12, #13}.

For example, i or j may be equal to 4, that is, the downlink subframe n or the uplink subframe n+k may include four time intervals. A time interval 0 includes the symbols {#0, #1, #2}, a time interval 1 includes the symbols {#3, #4, #5, #6}, a time interval 2 includes the symbols {#7, #8, #9}, and a time interval 3 includes the symbols {#10, #11, #12, #13}; or a time interval 0 includes the symbols {#0, #1, #2, #3}, a time interval 1 includes the symbols {#4, #5, #6}, a time interval 2 includes the symbols {#7, #8, #9, #10}, and a time interval 3 includes the symbols {#11, #12, #13}; or a time interval 0 includes the symbols {#0, #1}, a time interval 1 includes the symbols {#2, #3, #4, #5}, a time interval 2 includes the symbols {#6, #7, #8, #9}, and a time interval 3 includes the symbols {#10, #11, #12, #13}; or a time interval 0 includes the symbols {#2, #3, #4}, a time interval 1 includes the symbols {#5, #6, #7}, a time interval 2 includes the symbols {#8, #9, #10}, and a time interval 3 includes the symbols {#11, #12, #13}. For example, i or j may be equal to 2, that is, the downlink subframe n or the uplink subframe n+k may include two time intervals. A time interval 0 includes a first slot, and a time interval 1 includes a second slot. The first slot includes the symbols {#0, #1, #2, #3, #4, #5, #6}, and the second slot includes the symbols {#7, #8, #9, #10, #11, #12, #13}.

For example, i or j may be equal to 6, that is, the downlink subframe n or the uplink subframe n+k may include six time intervals. A time interval 0 includes the symbols {#0, #1}, a time interval 1 includes the symbols {#2, #3}, a time interval 2 includes the symbols {#4, #5, #6}, a time interval 3 includes the symbols {#7, #8}, a time interval 4 includes the symbols {#9, #10}, and a time interval 5 includes the symbols {#11, #12, #13}; or a time interval 0 includes the symbols {#0, #1}, a time interval 1 includes the symbols {#2, #3, #4}, a time interval 2 includes the symbols {#5, #6}, a time interval 3 includes the symbols {#7, #8}, a time interval 4 includes the symbols {#9, #10, #11}, and a time interval 5 includes the symbols {#12, #13}; or a time interval 0 includes the symbols {#0, #1, #2}, a time interval 1 includes the symbols {#3, #4}, a time interval 2 includes the symbols {#5, #6}, a time interval 3 includes the symbols {#7, #8, #9}, a time interval 4 includes the symbols {#10, #11}, and a time interval 5 includes the symbols {#12, #13}; or a time interval 0 includes the symbols {#2, #3}, a time interval 1 includes the symbols {#4, #5}, a time interval 2 includes the symbols {#6, #7}, a time interval 3 includes the symbols {#8, #9}, a time interval 4 includes the symbols {#10, #11}, and a time interval 5 includes the symbols {#12, #13}.

Optionally, an extended CP is used as an example. One subframe includes two slots, each slot is 0.5 millisecond, each slot includes six symbols, and 12 symbols of the subframe are respectively marked as #0, #1, #2, #3, #4, #5, #6, #7, #8, #9, #10, and #11.

For example, i or j may be equal to 12, that is, the downlink subframe n or the uplink subframe n+k may include 12 time intervals. A time interval 0 includes the symbol #0, a time interval 1 includes the symbol #1, a time interval 2 includes the symbol #2, a time interval 3 includes the symbol #3, a time interval 4 includes the symbol #4, a time interval 5 includes the symbol #5, a time interval 6 includes the symbol #6, a time interval 7 includes the symbol #7, a time interval 8 includes the symbol #8, a time interval 9 includes the symbol #9, a time interval 10 includes the symbol #10, and a time interval 11 includes the symbol #11.

For example, i or j may be equal to 6, that is, the downlink subframe n or the uplink subframe n+k may include six time intervals. A time interval 0 includes the symbols {#0, #1}, a time interval 1 includes the symbols {#2, #3}, a time interval 2 includes the symbols {#4, #5}, a time interval 3 includes the symbols {#6, #7}, a time interval 4 includes the symbols {#8, #9}, and a time interval 5 includes the symbols {#10, #11}.

For example, i or j may be equal to 4, that is, the downlink subframe n or the uplink subframe n+k may include four time intervals. A time interval 0 includes the symbols {#0, #1, #2}, a time interval 1 includes the symbols {#3, #4, #5}, a time interval 2 includes the symbols {#6, #7, #8}, and a time interval 3 includes the symbols {#9, #10, #11}; or a time interval 0 includes the symbols {#0, #1}, a time interval 1 includes the symbols {#2, #3, #4, #5}, a time interval 2 includes the symbols {#6, #7}, and a time interval 3 includes the symbols {#8, #9, #10, #11}; or a time interval 0 includes the symbols {#0, #1, #2, #3}, a time interval 1 includes the symbols {#4, #5}, a time interval 2 includes the symbols {#6, #7, #8, #9}, and a time interval 3 includes the symbols {#10, #11}.

For example, i or j may be equal to 2, that is, the downlink subframe n or the uplink subframe n+k may include two time intervals. A time interval 0 includes a first slot, and a time interval 1 includes a second slot. The first slot includes the symbols {#0, #1, #2, #3, #4, #5}, and the second slot includes the symbols {#6, #7, #8, #9, #10, #11}.

Optionally, uplink time intervals included in the uplink subframe n+k partially overlap.

For example, for the normal CP, j may be equal to 4, that is, the uplink subframe n+k may include four uplink time intervals. An uplink time interval 0 includes the symbols {#0, #1, #2, #3}, an uplink time interval 1 includes the symbols {#3, #4, #5, #6}, an uplink time interval 2 includes the symbols {#7, #8, #9, #10}, and an uplink time interval 3 includes the symbols {#10, #11, #12, #13}. In this case, the uplink time interval 0 and the uplink time interval 1 have the overlapping symbol #3, and the uplink time interval 2 and the uplink time interval 3 have the overlapping symbol #10. For example, for the extended CP, j may be equal to 4, that is, the uplink subframe n+k may include four uplink time intervals. An uplink time interval 0 includes the symbols {#0, #1, #2}, an uplink time interval 1 includes the symbols {#2, #3, #4, #5}, an uplink time interval 2 includes the symbols {#6, #7, #8}, and an uplink time interval 3 includes the symbols {#8, #9, #10, #11}. In this case, the uplink time interval 0 and the uplink time interval 1 have the overlapping symbol #2, and the uplink time interval 2 and the uplink time interval 3 have the overlapping symbol #8.

It should be noted that quantities and lengths of time intervals included in the subframes are merely examples. This is not limited in this embodiment of the present invention.

In an optional embodiment, i=7, that is, the downlink subframe n includes seven downlink time intervals; and j=2, that is, the uplink subframe n+k includes two uplink time intervals. In this case, a correspondence between the downlink time interval set and the determined uplink time interval may include any one of the following correspondences:

the downlink time interval set includes at least two of a downlink time interval 0, a downlink time interval 1, a downlink time interval 2, and a downlink time interval 3 of the downlink subframe n, and the determined uplink time interval is an uplink time interval 0 of the uplink subframe n+k; or the downlink time interval set includes at least two of a downlink time interval 3, a downlink time interval 4, a downlink time interval 5, and a downlink time interval 6 of the downlink subframe n, and the determined uplink time interval is an uplink time interval 1 of the uplink subframe n+k.

In addition, the downlink time interval set that includes at least two of the downlink time interval 0, the downlink time interval 1, the downlink time interval 2, and the downlink time interval 3 of the downlink subframe n and the downlink time interval set that includes at least two of the downlink time interval 3, the downlink time interval 4, the downlink time interval 5, and the downlink time interval 6 of the downlink subframe n may simultaneously exist, and it indicates that two pieces of uplink data are respectively scheduled in the time intervals included in the two downlink time interval sets, and each downlink time interval set is used to schedule one piece of uplink data. For subsequent content the same as the content herein, refer to descriptions herein. Optionally, if two downlink time interval sets simultaneously exist, the two downlink time interval sets do not intersect, that is, the two downlink time interval sets do not include a same downlink time interval.

In this embodiment of the present invention, a plurality of downlink time interval sets may simultaneously exist. In this case, the plurality of downlink time interval sets that simultaneously exist are used to respectively schedule a plurality of pieces of uplink data. Optionally, the plurality of downlink time interval sets do not intersect, that is, any two of the plurality of downlink time interval sets do not include a same downlink time interval.

It should be noted that in this embodiment of the present invention, when different downlink time interval sets do not include an overlapping downlink time interval, a maximum of one piece of scheduling signaling is sent in any downlink time interval in the downlink time interval set. Scheduling signaling sent in all downlink time intervals in a downlink time interval set is used to schedule same uplink data. For example, a downlink time interval set includes M downlink time intervals, and the terminal device separately receives N pieces of scheduling signaling in N downlink time intervals in the M downlink time intervals in the downlink time interval set, where M and N are positive integers, and N≤M. Only one piece of scheduling signaling used to schedule uplink data is sent in each of the N downlink time intervals.

However, when different downlink time interval sets include an overlapping downlink time interval, a plurality of pieces of scheduling signaling may be sent in the overlapping downlink time interval in this embodiment of the present invention. The plurality of pieces of scheduling signaling are used to respectively schedule a plurality of pieces of different uplink data. A quantity of the plurality of pieces of scheduling signaling may be the same as a quantity of the different downlink time interval sets.

That "the downlink time interval set includes at least two of a downlink time interval 0, a downlink time interval 1, a downlink time interval 2, and a downlink time interval 3" may be that the downlink time interval set includes the downlink time interval 0 and the downlink time interval 1, or the downlink time interval 0 and the downlink time interval 2, or the downlink time interval 0 and the downlink time interval 3, or the downlink time interval 1 and the downlink time interval 2, or the downlink time interval 1 and the downlink time interval 3, or the downlink time interval 2 and the downlink time interval 3, or the downlink time interval 0, the downlink time interval 1, and the downlink time interval 2, or the downlink time interval 0, the downlink time interval 1, and the downlink time interval 3, or the downlink time interval 0, the downlink time interval 2, and the downlink time interval 3, or the downlink time interval 1, the downlink time interval 2, and the downlink time interval 3, or the downlink time interval 0, the downlink time interval 1, the downlink time interval 2, and the downlink time interval 3.

That "the downlink time interval set includes at least two of a downlink time interval 3, a downlink time interval 4, a downlink time interval 5, and a downlink time interval 6" may be that the downlink time interval set includes the downlink time interval 3 and the downlink time interval 4, or the downlink time interval 3 and the downlink time interval 5, or the downlink time interval 3 and the downlink time interval 6, or the downlink time interval 4 and the downlink time interval 5, or the downlink time interval 4 and the downlink time interval 6, or the downlink time interval 5 and the downlink time interval 6, or the downlink time interval 3, the downlink time interval 4, and the downlink time interval 5, or the downlink time interval 3, the downlink time interval 4, and the downlink time interval 6, or the downlink time interval 3, the downlink time interval 5, and the downlink time interval 6, or the downlink time interval 4, the downlink time interval 5, and the downlink time interval 6, or the downlink time interval 3, the downlink time interval 4, the downlink time interval 5, and the downlink time interval 6.

For example, the downlink time interval set includes the downlink time interval 0, the downlink time interval 1, and the downlink time interval 2 of the downlink subframe n, and the determined uplink time interval is the uplink time interval 0 of the uplink subframe n+k. For example, the downlink time interval set includes the downlink time interval 3, the downlink time interval 4, the downlink time interval 5, and the downlink time interval 6 of the downlink subframe n, and the determined uplink time interval is the uplink time interval 1 of the uplink subframe n+k.

For example, the downlink time interval set includes the downlink time interval 0, the downlink time interval 1, the downlink time interval 2, and the downlink time interval 3 of the downlink subframe n, and the determined uplink time interval is the uplink time interval 0 of the uplink subframe n+k. For example, the downlink time interval set includes the downlink time interval 4, the downlink time interval 5, and the downlink time interval 6 of the downlink subframe n, and the determined uplink time interval is the uplink time interval 1 of the uplink subframe n+k.

Figure 3:
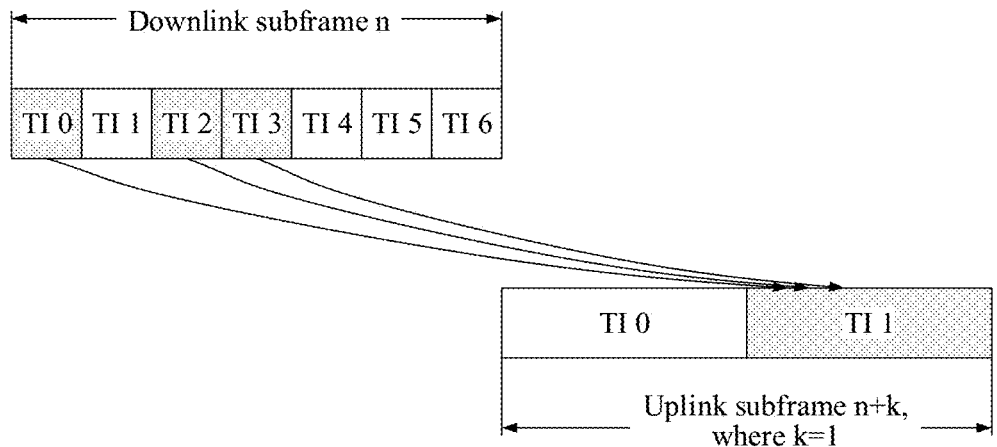
FIG. 3 is a schematic diagram of a second example according to an embodiment of the present invention.

Optionally, the downlink time interval set includes the downlink time interval 0 or the downlink time interval 1 of the downlink subframe n, and the determined uplink time interval is the uplink time interval 0 of the uplink subframe n+k. Alternatively, the downlink time interval set includes the downlink time interval 1 or the downlink time interval 2 of the downlink subframe n, and the determined uplink time interval is the uplink time interval 1 of the uplink subframe n+k. For example, as shown in FIG. 3, for a normal CP, i=7, and the downlink subframe n includes seven downlink time intervals; and j=2, and the uplink subframe n+1 includes two uplink time intervals. In this case, the downlink time interval set may include the downlink time interval 0, the downlink time interval 2, and the downlink time interval 3, and the determined uplink time interval is the uplink time interval 1 of the uplink subframe n+1. The terminal device receives the scheduling signaling in the at least one downlink time interval in the downlink time interval set, and sends the uplink data in the determined uplink time interval.

In another optional embodiment, for example, i=7, that is, the downlink subframe n includes seven downlink time intervals; and j=4, that is, the uplink subframe n+k includes four uplink time intervals. In this case, a correspondence between the downlink time interval set and the determined uplink time interval includes at least one of the following correspondences:

the downlink time interval set includes a downlink time interval 0 and/or a downlink time interval 1 of the downlink subframe n, and the determined uplink time interval is an uplink time interval 0 of the uplink subframe n+k; or the downlink time interval set includes a downlink time interval 1 and/or a downlink time interval 2 of the downlink subframe n, and the determined uplink time interval is an uplink time interval 1 of the uplink subframe n+k; or the downlink time interval set includes a downlink time interval 2 and/or a downlink time interval 3 of the downlink subframe n, and the determined uplink time interval is an uplink time interval 1 of the uplink subframe n+k; or the downlink time interval set includes a downlink time interval 3 and/or a downlink time interval 4 of the downlink subframe n, and the determined uplink time interval is an uplink time interval 2 of the uplink subframe n+k; or the downlink time interval set includes a downlink time interval 4 and/or a downlink time interval 5 of the downlink subframe n, and the determined uplink time interval is an uplink time interval 2 of the uplink subframe n+k; or the downlink time interval set includes a downlink time interval 5 and/or a downlink time interval 6 of the downlink subframe n, and the determined uplink time interval is an uplink time interval 3 of the uplink subframe n+k.

Figure 4:
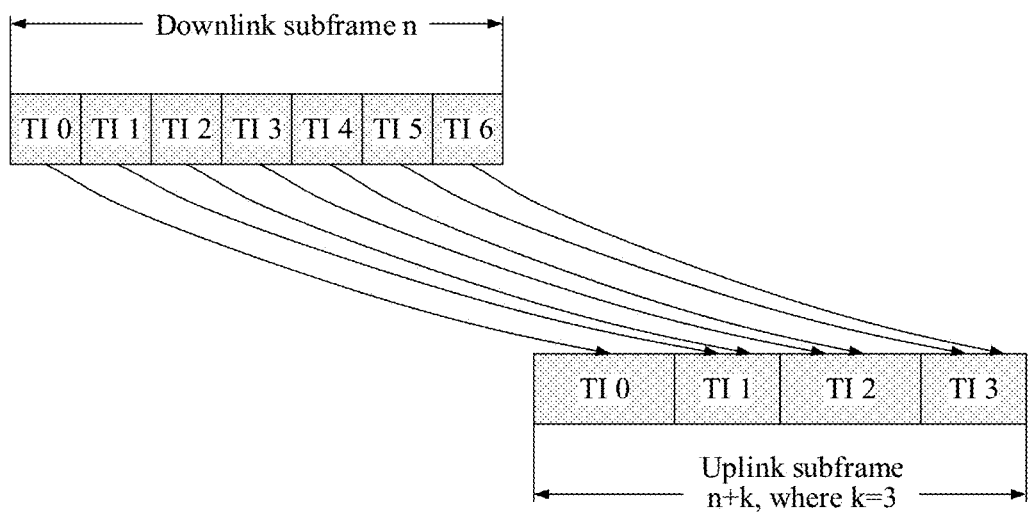
FIG. 4 is a schematic diagram of a third example according to an embodiment of the present invention.

For example, in this embodiment of the present invention, a plurality of pieces of uplink data may be scheduled in the downlink subframe n. As shown in FIG. 4, i=7, that is, the downlink subframe n includes seven downlink time intervals; and j=4, that is, the uplink subframe n+k includes four uplink time intervals. A first downlink time interval set includes a downlink time interval 0 of the downlink subframe n, and a determined first uplink time interval is an uplink time interval 0 of the uplink subframe n+k; and in this case, the terminal device receives, in the downlink time interval 0, scheduling signaling used to schedule first uplink data, and sends the first uplink data in the determined uplink time interval 0. A second downlink time interval set includes a downlink time interval 1 and a downlink time interval 2 of the downlink subframe n, and a determined second uplink time interval is an uplink time interval 1 of the uplink subframe n+k; and in this case, the terminal device receives, in at least one of the downlink time interval 1 and the downlink time interval 2, scheduling signaling used to schedule second uplink data, and sends the second uplink data in the determined uplink time interval 1. A third downlink time interval set includes a downlink time interval 3 and a downlink time interval 4 of the downlink subframe n, and a determined third uplink time interval is an uplink time interval 2 of the uplink subframe n+k; and in this case, the terminal device receives, in at least one of the downlink time interval 3 and the downlink time interval 4, scheduling signaling used to schedule third uplink data, and sends the third uplink data in the determined uplink time interval 2. A fourth downlink time interval set includes a downlink time interval 5 and a downlink time interval 6 of the downlink subframe n, and a determined fourth uplink time interval is an uplink time interval 3 of the uplink subframe n+k; and in this case, the terminal device receives, in at least one of the downlink time interval 5 and the downlink time interval 6, scheduling signaling used to schedule fourth uplink data, and sends the fourth uplink data in the determined uplink time interval 3.

For example, i=7, that is, the downlink subframe n includes seven downlink time intervals; and j=4, that is, the uplink subframe n+k includes four uplink time intervals. The downlink time interval set includes a downlink time interval 0 and a downlink time interval 1 of the downlink subframe n, and the determined uplink time interval is an uplink time interval 0 of the uplink subframe n+k; and/or the downlink time interval set includes a downlink time interval 2 and a downlink time interval 3 of the downlink subframe n, and the determined uplink time interval is an uplink time interval 1 of the uplink subframe n+k; and/or the downlink time interval set includes a downlink time interval 4 and a downlink time interval 5 of the downlink subframe n, and the determined uplink time interval is an uplink time interval 2 of the uplink subframe n+k; and/or the downlink time interval set includes a downlink time interval 6 of the downlink subframe n, and the determined uplink time interval is an uplink time interval 3 of the uplink subframe n+k.

For example, i=7, that is, the downlink subframe n includes seven downlink time intervals; and j=4, that is, the uplink subframe n+k includes four uplink time intervals. The downlink time interval set includes a downlink time interval 0 of the downlink subframe n, and the determined uplink time interval is an uplink time interval 0 of the uplink subframe n+k; and/or the downlink time interval set includes a downlink time interval 1 of the downlink subframe n, and the determined uplink time interval is an uplink time interval 1 of the uplink subframe n+k; and/or the downlink time interval set includes a downlink time interval 2 of the downlink subframe n, and the determined uplink time interval is an uplink time interval 2 of the uplink subframe n+k; and/or the downlink time interval set includes a downlink time interval 3 of the downlink subframe n, and the determined uplink time interval is an uplink time interval 3 of the uplink subframe n+k.

In still another optional embodiment, for example, i=4, that is, the downlink subframe n includes four downlink time intervals; and j=2, that is, the uplink subframe n+k includes two uplink time intervals. In this case, a correspondence between the downlink time interval set and the determined uplink time interval includes the following: The downlink time interval set includes a downlink time interval 0 and a downlink time interval 1 of the downlink subframe n, and the determined uplink time interval is an uplink time interval 0 of the uplink subframe n+k; and/or the downlink time interval set includes a downlink time interval 2 and a downlink time interval 3 of the downlink subframe n, and the determined uplink time interval is an uplink time interval 1 of the uplink subframe n+k.

In still another optional embodiment, for example, i=5, that is, the downlink subframe n includes five downlink time intervals; and j=4, that is, the uplink subframe n+k includes four uplink time intervals. In this case, a correspondence between the downlink time interval set and the determined uplink time interval includes at least one of the following correspondences:

the downlink time interval set includes at least one of a downlink time interval 0 and a downlink time interval 1 of the downlink subframe n, and the determined uplink time interval is an uplink time interval 0 of the uplink subframe n+k; or the downlink time interval set includes a downlink time interval 2 of the downlink subframe n, and the determined uplink time interval is an uplink time interval 1 of the uplink subframe n+k; or the downlink time interval set includes a downlink time interval 3 of the downlink subframe n, and the determined uplink time interval is an uplink time interval 2 of the uplink subframe n+k; or the downlink time interval set includes a downlink time interval 4 of the downlink subframe n, and the determined uplink time interval is an uplink time interval 3 of the uplink subframe n+k.

In still another optional embodiment, for example, i=5, that is, the downlink subframe n includes five downlink time intervals; and j=2, that is, the uplink subframe n+k includes two uplink time intervals. In this case, a correspondence between the downlink time interval set and the determined uplink time interval includes the following: The downlink time interval set includes at least two of a downlink time interval 0, a downlink time interval 1, and a downlink time interval 2 of the downlink subframe n, and the determined uplink time interval is an uplink time interval 0 of the uplink subframe n+k; and/or the downlink time interval set includes a downlink time interval 3 and a downlink time interval 4 of the downlink subframe n, and the determined uplink time interval is an uplink time interval 1 of the uplink subframe n+k.

In still another optional embodiment, for example, i=14 or 12, that is, the downlink subframe n includes 14 or 12 downlink time intervals; and j=7 or 6, that is, the uplink subframe n+k includes seven or six uplink time intervals. Preferably, k=1. In this case, a correspondence between the downlink time interval set and the determined uplink time interval includes at least one of the following correspondences:

the downlink time interval set includes a downlink time interval 0 and/or a downlink time interval 1 of the downlink subframe n, and the determined uplink time interval is an uplink time interval 0 of the uplink subframe n+k; or the downlink time interval set includes a downlink time interval 2 and/or a downlink time interval 3 of the downlink subframe n, and the determined uplink time interval is an uplink time interval 1 of the uplink subframe n+k; or the downlink time interval set includes a downlink time interval 4 and/or a downlink time interval 5 of the downlink subframe n, and the determined uplink time interval is an uplink time interval 2 of the uplink subframe n+k; or the downlink time interval set includes a downlink time interval 6 and/or a downlink time interval 7 of the downlink subframe n, and the determined uplink time interval is an uplink time interval 3 of the uplink subframe n+k; or the downlink time interval set includes a downlink time interval 8 and/or a downlink time interval 9 of the downlink subframe n, and the determined uplink time interval is an uplink time interval 4 of the uplink subframe n+k; or the downlink time interval set includes a downlink time interval 10 and/or a downlink time interval 11 of the downlink subframe n, and the determined uplink time interval is an uplink time interval 5 of the uplink subframe n+k; or the downlink time interval set includes a downlink time interval 12 and/or a downlink time interval 13 of the downlink subframe n, and the determined uplink time interval is an uplink time interval 6 of the uplink subframe n+k.

In still another optional embodiment, for example, i=14, that is, the downlink subframe n includes 14 downlink time intervals; and j=4, that is, the uplink subframe n+k includes four uplink time intervals. In this case, a correspondence between the downlink time interval set and the determined uplink time interval includes at least one of the following correspondences:

the downlink time interval set includes at least two of a downlink time interval 0, a downlink time interval 1, a downlink time interval 2, and a downlink time interval 3 of the downlink subframe n, and the determined uplink time interval is an uplink time interval 0 of the uplink subframe n+k; or the downlink time interval set includes at least two of a downlink time interval 3, a downlink time interval 4, a downlink time interval 5, and a downlink time interval 6 of the downlink subframe n, and the determined uplink time interval is an uplink time interval 1 of the uplink subframe n+k; or the downlink time interval set includes at least two of a downlink time interval 7, a downlink time interval 8, a downlink time interval 9, and a downlink time interval 10 of the downlink subframe n, and the determined uplink time interval is an uplink time interval 2 of the uplink subframe n+k; or the downlink time interval set includes at least two of a downlink time interval 10, a downlink time interval 11, a downlink time interval 12, and a downlink time interval 13 of the downlink subframe n, and the determined uplink time interval is an uplink time interval 3 of the uplink subframe n+k.

In still another optional embodiment, for example, i=14, that is, the downlink subframe n includes 14 downlink time intervals; and j=2, that is, the uplink subframe n+k includes two uplink time intervals. In this case, a correspondence between the downlink time interval set and the determined uplink time interval includes at least one of the following correspondences:

the downlink time interval set includes at least two of a downlink time interval 0, a downlink time interval 1, a downlink time interval 2, a downlink time interval 3, a downlink time interval 4, a downlink time interval 5, and a downlink time interval 6 of the downlink subframe n, and the determined uplink time interval is an uplink time interval 0 of the uplink subframe n+k; or the downlink time interval set includes at least two of a downlink time interval 7, a downlink time interval 8, a downlink time interval 9, a downlink time interval 10, a downlink time interval 11, a downlink time interval 12, and a downlink time interval 13 of the downlink subframe n, and the determined uplink time interval is an uplink time interval 1 of the uplink subframe n+k.

In still another optional embodiment, for example, i=2, that is, the downlink subframe n includes two downlink time intervals. In this case, a correspondence between the downlink time interval set and the determined uplink time interval includes the following: The downlink time interval set includes a downlink time interval 0 and a downlink time interval 1 of the downlink subframe n, and the determined uplink time interval is the uplink subframe n+k. It should be noted that the entire uplink subframe n+k is used as an uplink time interval.

In still another optional embodiment, for example, i=4, that is, the downlink subframe n includes four downlink time intervals. In this case, a correspondence between the downlink time interval set and the determined uplink time interval includes the following: The downlink time interval set includes at least two of a downlink time interval 0, a downlink time interval 1, a downlink time interval 2, and a downlink time interval 3 of the downlink subframe n, and the determined uplink time interval is the uplink subframe n+k.

In still another optional embodiment, for example, i=7 or 6, that is, the downlink subframe n includes seven or six downlink time intervals. In this case, a correspondence between the downlink time interval set and the determined uplink time interval includes the following: The downlink time interval set includes at least two of a downlink time interval 0, a downlink time interval 1, a downlink time interval 2, a downlink time interval 3, a downlink time interval 4, a downlink time interval 5, and a downlink time interval 6 of the downlink subframe n, and the determined uplink time interval is the uplink subframe n+k.

In still another optional embodiment, for example, i=14 or 12, that is, the downlink subframe n includes 14 or 12 downlink time intervals. In this case, a correspondence between the downlink time interval set and the determined uplink time interval includes the following: The downlink time interval set includes at least two of a downlink time interval 0, a downlink time interval 1, a downlink time interval 2, a downlink time interval 3, a downlink time interval 4, a downlink time interval 5, a downlink time interval 6, a downlink time interval 7, a downlink time interval 8, a downlink time interval 9, a downlink time interval 10, a downlink time interval 11, a downlink time interval 12, and a downlink time interval 13 of the downlink subframe n, and the determined uplink time interval is the uplink subframe n+k.

In still another optional embodiment, for example, i=6, that is, the downlink subframe n includes six downlink time intervals; and j=4, that is, the uplink subframe n+k includes four uplink time intervals. It should be noted that the downlink subframe n may use a normal CP or an extended CP. Likewise, the uplink subframe n+k may use a normal CP or an extended CP. In this case, a correspondence between the downlink time interval set and the determined uplink time interval includes at least one of the following correspondences:

the downlink time interval set includes a downlink time interval 0 and/or a downlink time interval 1 of the downlink subframe n, and the determined uplink time interval is an uplink time interval 0 of the uplink subframe n+k; or the downlink time interval set includes a downlink time interval 1 and/or a downlink time interval 2 of the downlink subframe n, and the determined uplink time interval is an uplink time interval 1 of the uplink subframe n+k; or the downlink time interval set includes a downlink time interval 2 and/or a downlink time interval 3 of the downlink subframe n, and the determined uplink time interval is an uplink time interval 1 or an uplink time interval 2 of the uplink subframe n+k; or the downlink time interval set includes a downlink time interval 3 and/or a downlink time interval 4 of the downlink subframe n, and the determined uplink time interval is an uplink time interval 2 of the uplink subframe n+k; or the downlink time interval set includes a downlink time interval 4 and/or a downlink time interval 5 of the downlink subframe n, and the determined uplink time interval is an uplink time interval 3 of the uplink subframe n+k.

In still another optional embodiment, for example, i=6, that is, the downlink subframe n includes six downlink time intervals; and j=2, that is, the uplink subframe n+k includes two uplink time intervals. In this case, a correspondence between the downlink time interval set and the determined uplink time interval includes at least one of the following correspondences: the downlink time interval set includes at least two of a downlink time interval 0, a downlink time interval 1, and a downlink time interval 2 of the downlink subframe n, and the determined uplink time interval is an uplink time interval 0 of the uplink subframe n+k; or the downlink time interval set includes at least two of a downlink time interval 3, a downlink time interval 4, and a downlink time interval 5 of the downlink subframe n, and the determined uplink time interval is an uplink time interval 1 of the uplink subframe n+k.

Optionally, at least two downlink time intervals in the downlink time interval set are not equal in length. In this case, a correspondence between the downlink time interval set and the determined uplink time interval includes the following correspondences:

Optionally, the length of the determined uplink time interval is 0.5 millisecond. Optionally, the downlink time interval set is in a first or second slot of the subframe n, and the determined uplink time interval is a first or second slot of the subframe n+k. Alternatively, the downlink time interval set includes three time intervals whose lengths are two symbols and one time interval whose length is one symbol.

Alternatively, the downlink time interval set includes two time intervals whose lengths are two symbols and one time interval whose length is three symbols.

Optionally, the length of the determined uplink time interval is three or four symbols. The downlink time interval set includes one time interval whose length is one symbol and one time interval whose length is two symbols, or includes two time intervals whose lengths are one symbol and one time interval whose length is two symbols. For example, the downlink time interval set includes one time interval including symbols whose sequence numbers are #4 and #5 and one time interval including a symbol whose sequence number is #6, and the uplink time interval includes symbols {#4, #5, #6} or {#3, #4, #5, #6}. For example, the downlink time interval set includes one time interval including symbols whose sequence numbers are #11 and #12 and one time interval including a symbol whose sequence number is #13, and the uplink time interval includes symbols {#11, #12, #13} or {#10, #11, #12, #13}.

Optionally, in this embodiment of the present invention, the scheduling signaling is used to schedule uplink data, or in other words, the scheduling signaling is used to schedule uplink data transmission, or in other words, the scheduling signaling is used to schedule a PUSCH. Therefore, before transmitting the uplink data, the terminal device needs to receive the scheduling signaling sent by the network device to the terminal device.

In this embodiment of the present invention, optionally, the scheduling signaling is an uplink grant UL grant. In this case, the terminal device receives at least one UL grant in the at least one downlink time interval in the downlink time interval set. The UL grant is used to schedule uplink data, or in other words, the UL grant is used to indicate uplink data, or in other words, the UL grant is used to schedule a PUSCH.

In this embodiment of the present invention, optionally, the scheduling signaling is signaling that carries hybrid automatic repeat request-acknowledgement (HARQ-ACK) information. The HARQ-ACK information indicates a negative acknowledgement NACK. The HARQ-ACK information includes an acknowledgement (ACK) and a negative acknowledgement (NACK). For example, if the network device correctly receives the uplink data, the network device sends, to the terminal device, HARQ-ACK information indicating an ACK. If the network device fails to correctly receive the uplink data, the network device sends, to the terminal device, HARQ-ACK information indicating a NACK, and the terminal device further retransmits the uplink data to the network device. In this case, the terminal device receives, in the at least one downlink time interval in the downlink time interval set, the HARQ-ACK information indicating a NACK, and then the terminal device retransmits the uplink data in the determined uplink time interval corresponding to the at least one downlink time interval. Therefore, a more flexible HARQ retransmission combination mechanism with fewer latencies is implemented.

In this embodiment of the present invention, optionally, before the terminal device sends the uplink data in the determined uplink time interval, the method further includes the following: The terminal device receives signaling used to indicate uplink scheduling timing. The uplink scheduling timing is used to indicate the correspondence between the downlink time interval set and the determined uplink time interval, and the signaling is higher layer signaling or physical layer signaling. Therefore, that the terminal device determines an uplink time interval corresponding to the at least one downlink time interval includes: determining, by the terminal device based on the uplink scheduling timing, the uplink time interval corresponding to the at least one downlink time interval. In this case, the network device may more flexibly configure the correspondence between the downlink time interval set and the determined uplink time interval for the terminal device. Therefore, scheduling flexibility and a probability of successful uplink data scheduling are improved.

In this embodiment of the present invention, optionally, before the terminal device sends the uplink data in the determined uplink time interval, the method further includes the following: The terminal device reports uplink scheduling timing supported by the terminal device. Optionally, before the terminal device sends the uplink data in the determined uplink time interval, the method further includes the following: The terminal device reports a processing capability. The processing capability is used to indicate uplink scheduling timing supported by the terminal device, or the processing capability is used to indicate an earliest time and a latest time that are supported by the terminal device to send the uplink data. In this embodiment of the present invention, after receiving the scheduling signaling in the downlink subframe n, the terminal device needs to send the uplink data in the uplink subframe n+k, where k=0, 1, 2, or 3. In other words, after receiving the signaling in the downlink subframe n, the terminal device needs to send, in an uplink subframe n+3 at the latest, the uplink data scheduled by the scheduling signaling. Therefore, a new requirement is imposed on the processing capability of the terminal device. However, different terminal devices usually have different processing capabilities, and therefore respective times of sending the uplink data by the terminal devices in response to the scheduling signaling may be different. For example, some terminal devices receive the scheduling signaling in the downlink subframe n, but can send, only in an uplink subframe n+1 at the earliest, the uplink data scheduled by the scheduling signaling, and can send, only in an uplink subframe n+2 at the latest, the uplink data scheduled by the scheduling signaling. For example, after receiving the scheduling signaling in the downlink subframe n, some terminal devices can send, in an uplink subframe n at the earliest, the uplink data scheduled by the scheduling signaling, and can send, in an uplink subframe n+3 at the latest, the uplink data scheduled by the scheduling signaling. For example, after receiving the scheduling signaling, some terminal devices can send the uplink data after eight symbols at the earliest, and need to send the uplink data within 2 milliseconds at the latest. In this case, the terminal devices may report respective processing capabilities to the network device, so that the network device more efficiently configures control parameters and allocates resources for the terminal devices with different processing capabilities.

Figure 5:
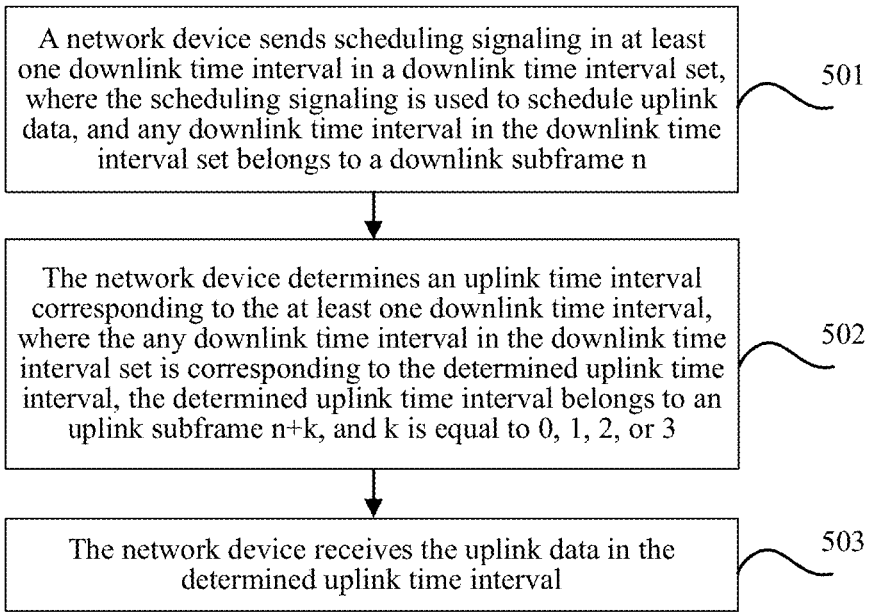
FIG. 5 is a schematic flowchart of an uplink data scheduling method according to an embodiment of the present invention.

FIG. 5 is a schematic flowchart of an uplink data scheduling method according to an embodiment of the present invention. It should be noted that the method may be used as an independent embodiment, or may be used with the uplink data sending method. Unless otherwise stated, for content in this embodiment same as that in the foregoing embodiment, refer to descriptions in the foregoing embodiment. Details are not subsequently described again. This embodiment includes the following steps.

Step 501: A network device sends scheduling signaling in at least one downlink time interval in a downlink time interval set, where the scheduling signaling is used to schedule uplink data, and any downlink time interval in the downlink time interval set belongs to a downlink subframe n.

Step 502: The network device determines an uplink time interval corresponding to the at least one downlink time interval, where the any downlink time interval in the downlink time interval set is corresponding to the determined uplink time interval, the determined uplink time interval belongs to an uplink subframe n+k, and k is equal to 0, 1, 2, or 3.

Step 503: The network device receives the uplink data in the determined uplink time interval.

There is no obvious time sequence relationship between step 501 and step 502. For example, the network device may perform step 501 before performing step 502, or may simultaneously perform step 501 and step 502, or may perform step 502 before performing step 501.

In an optional embodiment, the downlink time interval set may further include a time interval that belongs to a downlink subframe n+1. For example:

Step 501': A network device sends scheduling signaling in at least one downlink time interval in a downlink time interval set, where the scheduling signaling is used to schedule uplink data, the downlink time interval set includes a first subset and a second subset, any downlink time interval in the first subset belongs to a downlink subframe n, and any downlink time interval in the second subset belongs to a downlink subframe n+1.

Step 502': The network device determines an uplink time interval corresponding to the at least one downlink time interval, where any downlink time interval in the downlink time interval set is corresponding to the determined uplink time interval, the determined uplink time interval belongs to an uplink subframe n+k, and k is equal to 1, 2, or 3.

Step 503': The network device receives the uplink data in the determined uplink time interval.

There is no obvious time sequence relationship between step 501' and step 502'. For example, the network device may perform step 501' before performing step 502', or may simultaneously perform step 501' and step 502', or may perform step 502' before performing step 501'.

Figure 7:
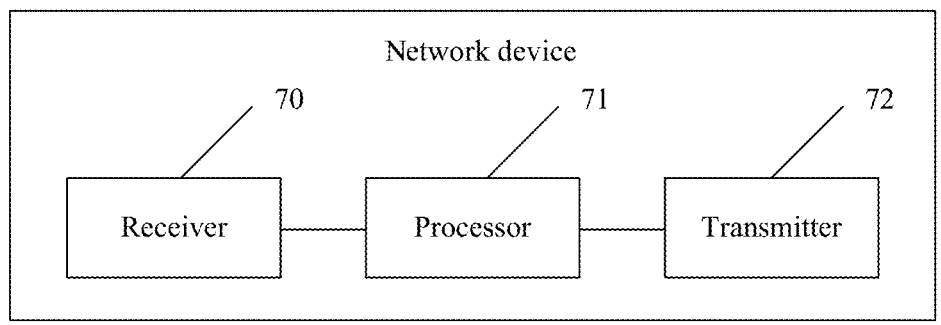
FIG. 7 is a schematic structural diagram of a first network device according to an embodiment of the present invention.

Further, an embodiment of the present invention further provides a network device for implementing the foregoing method. FIG. 7 is a schematic structural diagram of a network device according to an embodiment of the present invention. It should be noted that the network device may be configured to perform the method in the foregoing embodiment. Therefore, for content the same as that in the foregoing embodiment, refer to descriptions in the foregoing embodiment. Details are not subsequently described again.

The network device in this embodiment of the present invention may include a processor, a receiver, and a transmitter. Certainly, the network device may further include a memory, and the like.

The transmitter is configured to send scheduling signaling in at least one downlink time interval in a downlink time interval set. The scheduling signaling is used to schedule uplink data, and any downlink time interval in the downlink time interval set belongs to a downlink subframe n.

The processor is configured to determine an uplink time interval corresponding to the at least one downlink time interval. The any downlink time interval in the downlink time interval set is corresponding to the determined uplink time interval, the determined uplink time interval belongs to an uplink subframe n+k, and k is equal to 0, 1, 2, or 3.

The receiver is configured to receive the uplink data in the determined uplink time interval.

In an optional embodiment, the downlink time interval set may further include a time interval that belongs to a downlink subframe n+1. For example:

The transmitter is configured to send scheduling signaling in at least one downlink time interval in a downlink time interval set. The scheduling signaling is used to schedule uplink data, the downlink time interval set includes a first subset and a second subset, any downlink time interval in the first subset belongs to a downlink subframe n, and any downlink time interval in the second subset belongs to a downlink subframe n+1.

The processor is configured to determine an uplink time interval corresponding to the at least one downlink time interval. Any downlink time interval in the downlink time interval set is corresponding to the determined uplink time interval, the determined uplink time interval belongs to an uplink subframe n+k, and k is equal to 1, 2, or 3.

The receiver is configured to receive the uplink data in the determined uplink time interval.

Optionally, in the step of determining an uplink time interval corresponding to the at least one downlink time interval, a length of determined uplink time interval is greater than or equal to a length of the any downlink time interval in the downlink time interval set. For a specific length of a time interval in the downlink time interval set and the length of the determined uplink time interval, refer to descriptions in the foregoing embodiment. Details are not described herein again.

Optionally, the downlink subframe n includes i downlink time intervals, i is a positive integer, and the downlink time interval set is a subset of the i downlink time intervals. The uplink subframe n+k includes j uplink time intervals, j is a positive integer, and the determined uplink time interval is one of the j uplink time intervals, and i is different from j. For specific values of i and j and compositions or locations of the i downlink time intervals and the j uplink time intervals, refer to descriptions in the foregoing embodiment. Details are not described herein again.

Optionally, in the embodiment in which the downlink time interval set further includes the time interval that belongs to the downlink subframe n+1, the downlink subframe n+1 may include m downlink time intervals, where m is a positive integer, and i is the same as or different from m. In step 501', the downlink time interval set includes the first subset and the second subset, the first subset is a subset of the i downlink time intervals included in the downlink subframe n, and the second subset is a subset of the m downlink time intervals included in the downlink subframe n+1.

The network device determines the uplink time interval corresponding to the at least one downlink time interval. The any downlink time interval in the downlink time interval set is corresponding to the determined uplink time interval, the determined uplink time interval belongs to the uplink subframe n+k, and k is equal to 0, 1, 2, or 3. For a specific correspondence between the downlink time interval set and the determined uplink time interval, refer to descriptions in the foregoing embodiment. Details are not described herein again.

Optionally, before the network device receives the uplink data in the determined uplink time interval, the method further includes the following: The network device sends signaling used to indicate uplink scheduling timing. The uplink scheduling timing is used to indicate the correspondence between the downlink time interval set and the determined uplink time interval, and the signaling is higher layer signaling or physical layer signaling. The network device sends the uplink scheduling timing to a terminal device, so that the terminal device can determine, based on the uplink scheduling timing, the uplink time interval for sending the uplink data.

Optionally, before the network device receives the uplink data in the determined uplink time interval, the method further includes the following: The network device receives uplink scheduling timing that is reported by a terminal device and that is supported by the terminal device. Optionally, before the network device receives the uplink data in the determined uplink time interval, the method further includes the following: The network device receives a processing capability reported by a terminal device. The processing capability is used to indicate an earliest time and a latest time that are supported by the terminal device to send the uplink data. Because different terminal devices usually have different processing capabilities, respective times of sending the uplink data by the terminal devices in response to the scheduling signaling may be different. Therefore, the terminal devices may report respective processing capabilities to the network device, so that the network device more efficiently configures control parameters and allocates resources for the terminal devices with different processing capabilities.

Optionally, the scheduling signaling sent by the network device may be an uplink grant UL grant.

Optionally, the scheduling signaling is signaling that carries hybrid automatic repeat request-acknowledgement HARQ-ACK information. The HARQ-ACK information indicates a negative acknowledgement NACK. In this case, the network device sends, in the at least one downlink time interval in the downlink time interval set, HARQ-ACK information indicating a NACK, and then the network device receives the retransmitted uplink data in the determined uplink time interval corresponding to the at least one downlink time interval. Therefore, a more flexible HARQ retransmission combination mechanism with fewer latencies is implemented.

In this embodiment of the present invention, the network device sends the scheduling signaling in the at least one downlink time interval in the downlink time interval set, and the any downlink time interval in the downlink time interval set belongs to the downlink subframe n, so that the network device can send the scheduling signaling in the any downlink time interval in the downlink subframe n. Therefore, the uplink data can be scheduled in a flexible and timely manner, and a latency is reduced. In addition, in this embodiment of the present invention, the network device sends the scheduling signaling in the downlink subframe n, and receives the uplink data in the uplink subframe n+k, where k is equal to 0, 1, 2, or 3. Therefore, the uplink data is received in an uplink subframe n+3 at the latest, so that a latency of at least 4 milliseconds or four subframes from sending scheduling information to receiving uplink data in the prior art can be controlled to not exceed 4 milliseconds or four subframes, thereby further reducing the latency.

Figure 6A:
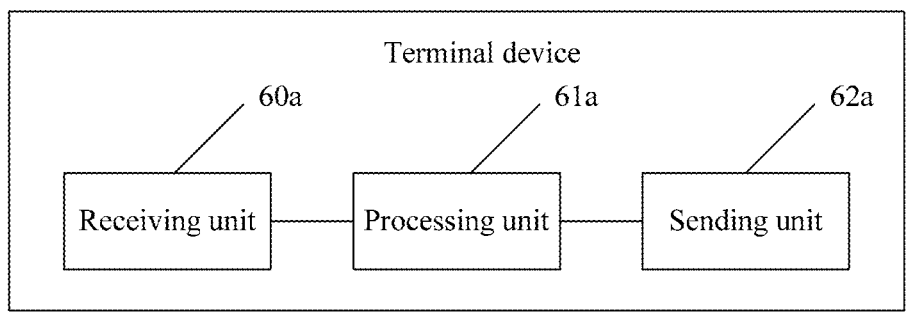
FIG. 6a is a schematic structural diagram of a second terminal device according to an embodiment of the present invention.

FIG. 6a is a schematic structural diagram of a terminal device according to an embodiment of the present invention. It should be noted that the terminal device may be configured to perform the method in the foregoing embodiment. Therefore, for content the same as that in the foregoing embodiment, refer to descriptions in the foregoing embodiment. Details are not subsequently described again.

The terminal device in this embodiment may include a processing unit, a receiving unit, and a sending unit.

The receiving unit is configured to receive scheduling signaling in at least one downlink time interval in a downlink time interval set. The scheduling signaling is used to schedule uplink data, and any downlink time interval in the downlink time interval set belongs to a downlink subframe n.

The processing unit is configured to determine an uplink time interval corresponding to the at least one downlink time interval. The any downlink time interval in the downlink time interval set is corresponding to the determined uplink time interval, the determined uplink time interval belongs to an uplink subframe n+k, and k is equal to 0, 1, 2, or 3.

The sending unit is configured to send the uplink data in the determined uplink time interval.

In an optional embodiment, the downlink time interval set may further include a time interval that belongs to a downlink subframe n+1. For example:

The receiving unit is configured to receive scheduling signaling in at least one downlink time interval in a downlink time interval set. The scheduling signaling is used to schedule uplink data, the downlink time interval set includes a first subset and a second subset, any downlink time interval in the first subset belongs to a downlink subframe n, and any downlink time interval in the second subset belongs to a downlink subframe n+1.

The processing unit is configured to determine an uplink time interval corresponding to the at least one downlink time interval. Any downlink time interval in the downlink time interval set is corresponding to the determined uplink time interval, the determined uplink time interval belongs to an uplink subframe n+k, and k is equal to 1, 2, or 3.

The sending unit is configured to send the uplink data in the determined uplink time interval.

It should be noted that for specific implementations of receiving the scheduling signaling and sending the uplink data by the terminal device, refer to descriptions in the method embodiment. The terminal device embodiment and the method embodiment are based on a same concept, and technical effects brought by the terminal device embodiment are the same as those brought by the method embodiment of the present invention. For details, refer to descriptions in the method embodiment of the present invention. Details are not described herein again.

To implement the foregoing embodiment, an embodiment of the present invention further provides a network device. It should be noted that the network device can perform the method in the foregoing embodiment. Therefore, for specific details of the network device, refer to descriptions in the foregoing embodiment. For brevity, same content in the following is not described again.

Figure 7A:
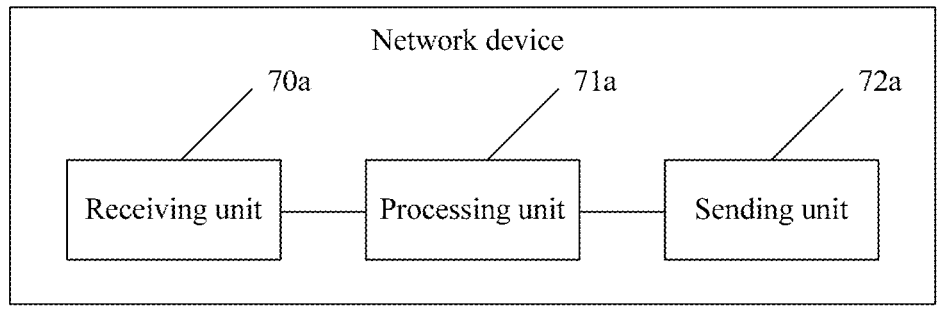
FIG. 7a is a schematic structural diagram of a second network device according to an embodiment of the present invention.

FIG. 7a is a schematic structural diagram of a network device according to an embodiment of the present invention. It should be noted that the network device may be configured to perform the method in the foregoing embodiment. Therefore, for content the same as that in the foregoing embodiment, refer to descriptions in the foregoing embodiment. Details are not subsequently described again.

The network device in this embodiment of the present invention may include a processing unit, a receiving unit, and a sending unit.

The sending unit is configured to send scheduling signaling in at least one downlink time interval in a downlink time interval set. The scheduling signaling is used to schedule uplink data, and any downlink time interval in the downlink time interval set belongs to a downlink subframe n.

The processing unit is configured to determine an uplink time interval corresponding to the at least one downlink time interval. The any downlink time interval in the downlink time interval set is corresponding to the determined uplink time interval, the determined uplink time interval belongs to an uplink subframe n+k, and k is equal to 0, 1, 2, or 3.

The receiving unit is configured to receive the uplink data in the determined uplink time interval.

In an optional embodiment, the downlink time interval set may further include a time interval that belongs to a downlink subframe n+1. For example:

The sending unit is configured to send scheduling signaling in at least one downlink time interval in a downlink time interval set. The scheduling signaling is used to schedule uplink data, the downlink time interval set includes a first subset and a second subset, any downlink time interval in the first subset belongs to a downlink subframe n, and any downlink time interval in the second subset belongs to a downlink subframe n+1.

The processing unit is configured to determine an uplink time interval corresponding to the at least one downlink time interval. Any downlink time interval in the downlink time interval set is corresponding to the determined uplink time interval, the determined uplink time interval belongs to an uplink subframe n+k, and k is equal to 1, 2, or 3.

The receiving unit is configured to receive the uplink data in the determined uplink time interval.

It should be noted that for specific implementations of sending the scheduling signaling and receiving the uplink data by the network device, refer to descriptions in the method embodiment. The network device embodiment and the method embodiment are based on a same concept, and technical effects brought by the network device embodiment are the same as those brought by the method embodiment of the present invention. For details, refer to descriptions in the method embodiment of the present invention. Details are not described herein again.

It should be noted that, the processor in all the embodiments of the present invention may be a central processing unit (CPU), or may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. In addition, the network device and the terminal device in the embodiments of the present invention may further include a component such as a memory. The memory herein may include a read-only memory and a random access memory, and provides an instruction and data for the processor. A part of the memory may further include a non-volatile random access memory. For example, the memory may further store information about a device type. The processor invokes instruction code in the memory, so as to control other modules of the network device and the terminal device in the embodiments of the present invention to perform the foregoing operations.

It should be understood that "an embodiment", "one embodiment", or "this embodiment of the present invention" mentioned in the whole specification means that particular features, structures, or characteristics related to the embodiment are included in at least one embodiment of the present invention. Therefore, "in an embodiment", "in one embodiment", or "in this embodiment of the present invention" appearing throughout the specification is not necessarily a same embodiment. In addition, these particular features, structures, or characteristics may be combined in one or more embodiments in any appropriate manner.

It should be understood that sequence numbers of the foregoing processes do not mean execution sequences in various embodiments of the present invention. The execution sequences of the processes should be determined based on functions and internal logic of the processes, and should not be construed as any limitation on the implementation processes of the embodiments of the present invention.

In addition, the terms "system" and "network" in this specification may often be interchangeable in this specification. It should be understood that the term "and/or" in this specification describes only an association relationship for describing associated objects and represents that three types of relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should further be understood that determining B based on A does not mean that B is determined based on A only, and B may alternatively be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In the embodiments of this application, the displayed or discussed mutual couplings or direct couplings or communication connections may be implemented by using some interfaces. The indirect couplings or communication connections between the apparatuses or units may be implemented in electronic, mechanical, or other forms.

The foregoing units as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
receiving, by a terminal device, scheduling signaling in at least one downlink time interval in a downlink time interval set, wherein the scheduling signaling is used to schedule uplink data;
determining, by the terminal device, an uplink time interval corresponding to the at least one downlink time interval, wherein all downlink time intervals in the downlink time interval set correspond to the determined uplink time interval, and wherein a length of the determined uplink time interval is greater than a length of any downlink time interval in the downlink time interval set; and
sending, by the terminal device, the uplink data in the determined uplink time interval;
wherein the any downlink time interval in the downlink time interval set belongs to a downlink subframe n and the determined uplink time interval belongs to an uplink subframe n+2, or
wherein the downlink time interval set includes a first subset and a second subset, any downlink time interval in the first subset belongs to a downlink subframe n, any downlink time interval in the second subset belongs to a downlink subframe n+1, and the determined uplink time interval belongs to an uplink subframe n+3.

2. The method according to claim 1, wherein the downlink subframe n comprises six downlink time intervals, and the downlink time interval set is a subset of the six downlink time intervals; and
wherein the uplink subframe n+2 comprises two uplink time intervals, and the determined uplink time interval is one of the two uplink time intervals.

3. The method according to claim 1, wherein the downlink time interval set comprises two time intervals which lengths are two symbols and one time interval which length is three symbols, and a length of the determined uplink time interval is 0.5 millisecond.

4. The method according to claim 1, before the sending, by the terminal device, the uplink data in the determined uplink time interval, further comprising:
receiving, by the terminal device, signaling used to indicate uplink scheduling timing, wherein the uplink scheduling timing is used to indicate a correspondence between the downlink time interval set and the determined uplink time interval, and the signaling is high layer signaling or physical layer signaling; and
wherein the determining, by the terminal device, an uplink time interval corresponding to the at least one downlink time interval comprises: determining, by the terminal device and based on the uplink scheduling timing, the uplink time interval corresponding to the at least one downlink time interval.

5. The method according to claim 1, wherein at least two downlink time intervals in the downlink time interval set are not equal in length.

6. An apparatus, comprising:
a memory storing program instructions; and
at least one processor coupled to the memory;
wherein when executed by the at least one processor, the program instructions cause the apparatus to:
receive scheduling signaling in at least one downlink time interval in a downlink time interval set, wherein the scheduling signaling is used to schedule uplink data;
determine an uplink time interval corresponding to the at least one downlink time interval, wherein all downlink time intervals in the downlink time interval set correspond to the determined uplink time interval, and wherein a length of the determined uplink time interval is greater than a length of any downlink time interval in the downlink time interval set; and
send the uplink data in the determined uplink time interval;
wherein the any downlink time interval in the downlink time interval set belongs to a downlink subframe n and the determined uplink time interval belongs to an uplink subframe n+2, or
wherein the downlink time interval set includes a first subset and a second subset, any downlink time interval in the first subset belongs to a downlink subframe n, any downlink time interval in the second subset belongs to a downlink subframe n+1, and the determined uplink time interval belongs to an uplink subframe n+3.

7. The apparatus according to claim 6, wherein the downlink subframe n comprises six downlink time intervals, and the downlink time interval set is a subset of the six downlink time intervals; and
wherein the uplink subframe n+2 comprises two uplink time intervals, and the determined uplink time interval is one of the two uplink time intervals.

8. The apparatus according to claim 6, wherein the downlink time interval set comprises two time intervals which lengths are two symbols and one time interval which length is three symbols, and a length of the determined uplink time interval is 0.5 millisecond.

9. The apparatus according to claim 6, wherein the program instructions further cause the apparatus to:
before sending the uplink data, receive signaling used to indicate uplink scheduling timing, wherein the uplink scheduling timing is used to indicate a correspondence between the downlink time interval set and the determined uplink time interval, and the signaling is high layer signaling or physical layer signaling; and
determine, based on the uplink scheduling timing, the uplink time interval corresponding to the at least one downlink time interval.

10. The apparatus according to claim 6, wherein at least two downlink time intervals in the downlink time interval set are not equal in length.

11. The apparatus according to claim 6, wherein the apparatus is a terminal device.

12. A non-transitory computer-readable storage medium storing programming instructions which, when executed by a computer, cause the computer to perform operations comprising:
receiving scheduling signaling in at least one downlink time interval in a downlink time interval set, wherein the scheduling signaling is used to schedule uplink data;

determining an uplink time interval corresponding to the at least one downlink time interval, wherein all downlink time intervals in the downlink time interval set correspond to the determined uplink time interval, and wherein a length of the determined uplink time interval is greater than a length of any downlink time interval in the downlink time interval set; and sending the uplink data in the determined uplink time interval;

wherein the any downlink time interval in the downlink time interval set belongs to a downlink subframe n and the determined uplink time interval belongs to an uplink subframe n+2, or wherein the downlink time interval set includes a first subset and a second subset, any downlink time interval in the first subset belongs to a downlink subframe n, any downlink time interval in the second subset belongs to a downlink subframe n+1, and the determined uplink time interval belongs to an uplink subframe n+3.

13. The non-transitory computer-readable storage medium according to claim 12, wherein the downlink subframe n comprises six downlink time intervals, and the downlink time interval set is a subset of the six downlink time intervals; and wherein the uplink subframe n+2 comprises two uplink time intervals, and the determined uplink time interval is one of the two uplink time intervals.

14. The non-transitory computer-readable storage medium according to claim 12, wherein the downlink time interval set comprises two time intervals which lengths are two symbols and one time interval which length is three symbols, and a length of the determined uplink time interval is 0.5 millisecond.

15. The non-transitory computer-readable storage medium according to claim 12, the operations further comprising:

receiving signaling used to indicate uplink scheduling timing, wherein the uplink scheduling timing is used to indicate a correspondence between the downlink time interval set and the determined uplink time interval, and the signaling is high layer signaling or physical layer signaling; and determining, based on the uplink scheduling timing, the uplink time interval corresponding to the at least one downlink time interval.

16. The non-transitory computer-readable storage medium according to claim 12, wherein at least two downlink time intervals in the downlink time interval set are not equal in length.

\* \* \* \* \*